(12) United States Patent
Cheng et al.

(10) Patent No.: US 12,500,737 B2
(45) Date of Patent: Dec. 16, 2025

(54) SYSTEM AND METHOD FOR COST MANAGEMENT USING BLOCKCHAIN AND ENCRYPTION

(71) Applicant: The Hong Kong University of Science and Technology, Hong Kong (CN)

(72) Inventors: Jack Chin Pang Cheng, Hong Kong (CN); Hao Liu, Hong Kong (CN); Moumita Das, Hong Kong (CN); Xingyu Tao, Hong Kong (CN); Jielong Gan, Hong Kong (CN); Shanjing Zhou, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 176 days.

(21) Appl. No.: 18/608,860

(22) Filed: Mar. 18, 2024

(65) Prior Publication Data
US 2024/0372699 A1 Nov. 7, 2024

Related U.S. Application Data

(60) Provisional application No. 63/500,272, filed on May 5, 2023.

(51) Int. Cl.
*H04L 29/06* (2006.01)
*H04L 9/06* (2006.01)
*H04L 9/40* (2022.01)

(52) U.S. Cl.
CPC ........ *H04L 9/0618* (2013.01); *H04L 63/0407* (2013.01); *H04L 63/10* (2013.01)

(58) Field of Classification Search
CPC .... H04L 9/0618; H04L 63/0407; H04L 63/10
See application file for complete search history.

(56) References Cited

U.S. PATENT DOCUMENTS

| 10,459,990 | B1 | 10/2019 | Li et al. |
| 11,546,348 | B2 * | 1/2023 | Li ............................ H04L 9/008 |

(Continued)

FOREIGN PATENT DOCUMENTS

| AU | 2021101878 A4 | 7/2021 |
| CN | 109934599 A | 6/2019 |

(Continued)

OTHER PUBLICATIONS

Ken Peffers et al., "A Design Science Research Methodology for Information Systems Research," Journal of Management Information Systems, 2007, vol. 24, p. 45-77.

(Continued)

*Primary Examiner* — Evans Desrosiers
(74) *Attorney, Agent, or Firm* — Idea Intellectual Limited; Sam T. Yip

(57) ABSTRACT

A system for cost management using blockchain and encryption is provided. The system includes an access interface, a recorder, a determinator, a key generator, an encryptor, and a decryptor. The access interface is configured to provide a platform for users to log in. The recorder is for recording cost information. The determinator is configured to determine whether the cost information recorded in the recorder is non-sensitive. When the cost information is determined as being non-sensitive, the cost information is directly uploaded to and recorded on a blockchain network via a smart contractor module. When the cost information is determined as being sensitive, the key generator generates a symmetric key randomly. The encryptor is configure to encrypt the cost information using the symmetric key to obtain ciphertext information and encrypt the symmetric key using public keys to obtain encrypted keys. The encryptor sends the ciphertext information to the blockchain network.

13 Claims, 18 Drawing Sheets

(56) References Cited

U.S. PATENT DOCUMENTS

| | | | |
|---|---|---|---|
| 11,563,569 | B2 | 1/2023 | Hu et al. |
| 2021/0182423 | A1 | 6/2021 | Padmanabhan |
| 2021/0226785 | A1 | 7/2021 | Notani |
| 2021/0320973 | A1 | 10/2021 | Basu et al. |
| 2022/0210061 | A1 | 6/2022 | Simu et al. |
| 2023/0261887 | A1* | 8/2023 | Yoon ............... H04L 9/0825 713/171 |
| 2024/0346257 | A1* | 10/2024 | Bersagel ............... G06F 40/40 |

FOREIGN PATENT DOCUMENTS

| | | |
|---|---|---|
| CN | 110430186 A | 11/2019 |
| CN | 108063752 B | 5/2020 |
| CN | 111404895 A | 7/2020 |
| CN | 111884805 A | 11/2020 |
| CN | 111915169 A | 11/2020 |
| CN | 109120639 B | 3/2021 |
| CN | 113810421 A | 12/2021 |
| CN | 114881738 A | 8/2022 |
| CN | 115131167 A | 9/2022 |
| IN | 202041018617 A | 6/2020 |
| IN | 202241005749 A | 2/2022 |
| IN | 202211046934 A | 8/2022 |

OTHER PUBLICATIONS

Srinath Perera et al., "Blockchain technology: Is it hype or real in the construction industry?," Journal of Industrial Information Integration, 2020, vol. 17 (100125), p. 1-20.

Anton Hasselgren et al., "Blockchain in healthcare and health sciences—A scoping review," International Journal of Medical Informatics, 2020, p. 134 (104040), p. 1-10.

Botao Zhong et al., "Hyperledger fabric-based consortium blockchain for construction quality information management," Frontiers of Engineering Management, 2020, vol. 7, p. 1-16.

Hyperledger Foundation, "Hyperledger Fabric" URL: https://www.hyperledger.org/projects/fabric Accessed Dec. 16, 2021.

Liupengfei Wu et al., "Using Blockchain to Improve Information Sharing Accuracy in the Onsite Assembly of Modular Construction," Journal of Management in Engineering, 2022, vol. 38 (3), p. 1-28.

Caroline T. W. Chan, "Estimating and Measurement for Simple Building Works in Hong Kong," Routledge, 2021, Second Edition.

Yuhan Liu et al., "BIM-BVBS integration with openBIM standards for automatic prefabrication of steel reinforcement," Automation in Construction, 2021, vol. 125 (103654), p. 1-19.

Elaine Barker, "NIST Special Publication 800-175B Revision 1—Guideline for Using Cryptographic Standards in the Federal Government: Cryptographic Mechanisms," National Institute of Standards and Technology, 2020, p. 1-91.

Gustavus J. Simmons, "Symmetric and Asymmetric Encryption," ACM Computing Surveys, 1979, vol. 11 (4), p. 305-330.

Sourabh Chandra et al., "A Comparative Survey of Symmetric and Asymmetric Key Cryptography," 2014 International Conference on Electronics, Communication and Computational Engineering (ICECCE), 2014, p. 83-93.

Elaine Barker, "NIST Special Publication 800-57 Part 1 Revision 5—Recommendation for Key Management: Part 1—General," National Institute of Standards and Technology, 2020, p. 1-171.

David Nuñez et al., "Proxy Re-Encryption: Analysis of Constructions and its Application to Secure Access Delegation," Journal of Network and Computer Applications, 2017, vol. 87, p. 193-209.

Anca Ivan et al., "Proxy Cryptography Revisited," The Network and Distributed System Security (NDSS) Symposium 2003, 2003, p. 1-20.

R. L. Rivest et al., "A Method for Obtaining Digital Signatures and Public-Key Cryptosystems," Communications of the ACM, 1978, vol. 21 (2), p. 120-126.

Hyperledger Foundation, "Hyperledger Explorer" URL: https://github.com/hyperledger-labs/blockchain-explorer Accessed Jun. 13, 2022.

Google, "The Go Programming Language" URL: https://go.dev/ Accessed Mar. 26, 2022.

Google, "crypto" URL: https://pkg.go.dev/crypto Accessed Apr. 14, 2022.

Hyperledger—Technical Working Group China, "tape" URL: https://github.com/Hyperledger-TWGC/tape Accessed May 2, 2022.

Sivachokkapu, "revive-cc" URL: https://github.com/sivachokkapu/revive-cc Accessed Feb. 7, 2023.

Jatinder Singh et al., "Blockchain as a Service (BaaS): Providers and Trust," 2018 IEEE European Symposium on Security and Privacy Workshops, 2018, p. 67-74.

Yanling Ni et al., "Blockchain-Based BIM Digital Project Management Mechanism Research," IEEE Access, 2021, vol. 9, p. 161342-161351.

Der-Chen Huang et al., "A Digital Media Subscription Management System Combined with Blockchain and Proxy Re-Encryption Mechanisms," symmetry, 2022, vol. 14 (2167), p. 1-35.

Jack C.P. Cheng et al., "Construction cost management using blockchain and encryption," Automation in Construction, 2023, vol. 152 (104841), p. 1-22.

Hesam Hamledari et al., "The application of blockchain-based crypto assets for integrating the physical and financial supply chains in the construction & engineering industry," Automation in Construction, 2021, 127 (103711), p. 1-15.

Moumita Das et al., "Securing interim payments in construction projects through a blockchain-based framework," Automation in Construction, 2020, 118 (103284), p. 1-21.

Rifat Sonmez et al., "BIM integrated smart contract for construction project progress payment administration," Automation in Construction, 2022, 139 (104294), p. 1-12.

Katharina Sigalov et al., "Automated Payment and Contract Management in the Construction Industry by Integrating Building Information Modeling and Blockchain-Based Smart Contracts," Applied Sciences, 2021, vol. 11 (7653), p. 1-23.

Liupengfei Wu et al., "Blockchain-based smart contract for smart payment in construction: A focus on the payment freezing and disbursement cycle," Frontiers of Engineering Management, 2022, vol. 9 (2), p. 177-195.

Salar Ahmadisheykhsarmast et al., "A smart contract system for security of payment of construction contracts," Automation in Construction, 2020, vol. 120 (103401), p. 1-14.

Xingyu Tao et al., "Confidentiality-minded Framework (CMF) for Blockchain-Based BIM Design Collaboration," Automation in Construction, 2022, vol. 136 (104172), p. 1-41.

Faris Elghaish et al., "Integrated project delivery with blockchain: An automated financial system," Automation in Construction, 2020, vol. 114 (103182), p. 1-16.

Weisheng Lu et al., "Blockchain Technology for Governmental Supervision of Construction Work: Learning from Digital Currency Electronic Payment Systems," Journal of Construction Engineering and Management, 2021, vol. 147 (10), p. 1-29.

Moumita Das et al., "A Blockchain-based Integrated Document Management Framework for Construction Applications," Automation in Construction. 2022, vol. 133 (104001), p. 1-44.

Weisheng Lu et al., "BIM and Big Data for Construction Cost Management," Routledge, 2021, 1st Edition, p. 1-56.

Hao Liu et al., "A knowledge model-based BIM framework for automatic code-compliant quantity take-off," Automation in Construction, 2022, vol. 133 (104024), p. 1-57.

Yuan Chen et al., "A framework for using mobile computing for information management on construction sites, Automation in Construction," 2011, vol. 20, p. 776-788.

Z.M. Deng et al., "An application of the Internet-based project management system," Automation in Construction, 2001, vol. 10, p. 239-246.

António Grilo et al., "Challenging electronic procurement in the AEC sector: A BIM-based integrated perspective," Automation in Construction, 2011, vol. 20, p. 107-114.

Timothy O. Olawumi, et al., "Identifying and prioritizing the benefits of integrating BIM and sustainability practices in construc-

(56) References Cited

OTHER PUBLICATIONS tion projects: A Delphi survey of international experts," Sustainable Cities and Society, 2018, vol. 40, p. 16-27.
O. Abudayyeh et al., "An Intranet-based cost control system," Advances in Engineering Software, 2001, vol. 32, p. 87-94.
Sai On Cheung et al., "PPMS: a Web-based construction Project Performance Monitoring System," Automation in Construction, 2004, vol. 13, p. 361-376.
Zhiliang Ma et al., "Using XML to support information exchange in construction projects," Automation in Construction, 2004, vol. 13, p. 629-637.
C.J. Anumba et al., "Collaborative project information management in a semantic web environment," Engineering, Construction and Architectural Management, 2008, vol. 15 (1), p. 78-94.
Sitsofe Kwame Yevu et al., "Electronic Procurement Systems Adoption in Construction Procurement: A Global Survey on the Barriers and Strategies from the Developed and Developing Economies," Journal of Construction Engineering and Management, 2022, vol. 148 (1), p. 1-15.
Bharadwaj R. K. Mantha et al., "Cyber security challenges and vulnerability assessment in the construction industry," Proceedings of the Creative Construction Conference 2019, 2019, p. 29-37.
Žiga Turk et al., "A systemic framework for addressing cybersecurity in construction," Automation in Construction, 2022, vol. 133 (103988), p. 1-14.
Žiga Turk et al., "Potentials of Blockchain Technology for Construction Management," Procedia Engineering, 2017, vol. 196, p. 638-645.
Balint Penzes et al., Blockchain Technology in the Construction Industry: Digital Transformation for High Productivity, Institution of Civil Engineers, 2018, p. 1-52.
Nawari O. Nawari et al., "Blockchain Technology and BIM Process: Review and Potential Applications," Journal of Information Technology in Construction, 2019, vol. 24, p. 209-238.
Xingyu Tao et al., "Distributed common data environment using blockchain and Interplanetary File System for secure BIM-based collaborative design," Automation in Construction, 2021, vol. 130 (103851), p. 1-22.
Jun Wang et al., "The outlook of blockchain technology for construction engineering management," Frontiers of Engineering Management, 2017, vol. 4(1), p. 67-75.
Hasni Gayathma Gunasekara et al., "Effective use of blockchain technology for facilities management procurement process," Journal of Facilities Management, 2021, vol. 20 (3), p. 452-468.
Dimosthenis Kifokeris et al., "A Conceptual Digital Business Model for Construction Logistics Consultants, Featuring a Sociomaterial Blockchain Solution for Integrated Economic, Material and Information Flows," Journal of Information Technology in Construction, 2020, vol. 25, p. 500-521.
Muhandiramge Nimashi Navodana Rodrigo et al., "Potential Application of Blockchain Technology for Embodied Carbon Estimating in Construction Supply Chains," Buildings, 2020, vol. 10 (140), p. 1-13.
Royal Institution of Chartered Surveyors, "Cost prediction," Nov. 2020, 1st edition, p. 1-56.
Moumita Das et al., "BIM security: A critical review and recommendations using encryption strategy and blockchain," Automation in Construction, 2021, vol. 126 (103682), p. 1-22.
The International Organization for Standardization, "Organization and digitization of information about buildings and civil engineering works, including building information modelling (BIM)—Information management using building information modelling—Part 5: Security-minded approach to information management," 2020, ISO 19650-5:2020, p. 1-43.
Mathis Steichen et al., "Blockchain-Based, Decentralized Access Control for IPFS," 2018 IEEE International Conference on Internet of Things and IEEE Green Computing and Communications and IEEE Cyber, Physical and Social Computing and IEEE Smart Data, 2018, p. 1499-1506.
Ahmed Raza Rajput et al., "EACMS: Emergency Access Control Management System for Personal Health Record Based on Blockchain," IEEE Access, 2019, vol. 7, p. 84304-84317.
Azzam Raslan et al., "A Framework for Assembling Asset Information Models (AIMs) through Permissioned Blockchain," 2020 IEEE 44th Annual Computers, Software, and Applications Conference (COMPSAC), 2020, p. 529-534.
Ashar Ahmad et al., "Towards Blockchain-Driven, Secure and Transparent Audit Logs," Proceedings of the 15th EAI International Conference on Mobile and Ubiquitous Systems: Computing, Networking and Services, 2018, p. 443-448.
Nawari O. Nawari et al., "Blockchain and the built environment: Potentials and limitations," Journal of Building Engineering, 2019, vol. 25 (100832), p. 1-16.
Marten Risius et al., "A Blockchain Research Framework: What We (don't) Know, Where We Go from Here, and How We Will Get There," Business & Information Systems Engineering, 2017, vol. 59, p. 385-409.
Jennifer Li et al., "Applications of Distributed Ledger Technology (DLT) and Blockchain-enabled Smart Contracts in Construction," Automation in Construction, 2021, vol. 132 (103955), p. 1-46.
Abhinaw Sai Erri Pradeep et al., "Blockchain-aided information exchange records for design liability control and improved security," Automation in Construction, 2021, vol. 126 (103667), p. 1-32.
Jorge De La Peña et al., "From Relational To Technological Trust: How Do the Internet of Things and Blockchain Technology Fit In?," 2019 European Conference on Computing in Construction, 2019, p. 415-424.
Xiao Li et al., "Blockchain-Enabled IoT-BIM Platform for Supply Chain Management in Modular Construction," Journal of Construction Engineering and Management, 2022, vol. 148 (2), p. 1-32.
Da Sheng et al., "Construction quality information management with blockchains," Automation in Construction, 2020, vol. 120 (103373), p. 1-16.
Shiyao Lin et al., "Supporting lock-based multiprocessor resource sharing protocols in real-time programming languages," Concurrency and Computation: Practice and Experience, 2013, vol. 25 (16), p. 2227-2251.
Qasim Mahmood Rajpoot et al., "Attributes Enhanced Role-Based Access Control Model," 12th International conference on Trust, Privacy and Security in Digital Business, 2015, p. 1-16.
Rongyue Zheng et al., "bcBIM: A Blockchain-Based Big Data Model for BIM Modification Audit and Provenance in Mobile Cloud," Mathematical Problems in Engineering, 2019, vol. 2019 (e5349538), p. 1-13.
Xiao Li et al., "Two-layer Adaptive Blockchain-based Supervision model for off-site modular housing production," Computers in Industry, 2021, vol. 128 (103437), p. 1-15.
Elli Androulaki et al., "Hyperledger Fabric: A Distributed Operating System for Permissioned Blockchains," Proceedings of the Thirteenth EuroSys Conference, 2018, p. 1-15.

* cited by examiner

SYSTEM AND METHOD FOR COST MANAGEMENT USING BLOCKCHAIN AND ENCRYPTION

CROSS-REFERENCE TO RELATED APPLICATIONS

The present application claims priority to provisional U.S. Patent Application No. 63/500,272 filed May 5, 2023, the disclosure of which is incorporated by reference herein.

TECHNICAL FIELD

The present invention generally relates to the field of Blockchain and Encryption techniques, particularly to systems and methods for cost management using blockchain and encryption.

BACKGROUND

Construction cost management is a fragmented and information-intensive process where different kinds of cost-related information such as material quantities, unit costs, and pricing are exchanged among project stakeholders. The traditional paper-based practice has been recognized as an error-prone and inefficient way of making the information exchange clogged and undermined. Digital transformation has been introduced to reshape the paradigm in cost information management. Supported by an online environment, different stakeholders can electronically share cost-related information and streamline cost management, thereby improving the quality of cost data deliverables and the efficiency of decision-making.

However, existing digital platforms for construction cost management are vulnerable to cybersecurity risks such as data manipulation due to the centralized architecture. Internal or external actors with malicious intents may abuse their privileges to unwittingly tamper with bidding and cost information, resulting in bidding and/or project failures with the loss of cost data accountability (i.e., cost data integrity and traceability). Blockchain is an emerging and promising solution to overcome such challenges. It is a distributed ledger technology (DLT) that features immutability, traceability, and decentralization by adopting cryptography and decentralized consensus mechanisms. Differing from conventional centralized systems, data in the blockchain ledger is irreversibly recorded through cryptography methods and collectively maintained by each member in the blockchain network through decentralized consensus mechanisms to protect data integrity without third parties. The cryptography mechanism that irreversibly stores data records can prevent malicious manipulation of construction cost information. The distributed ledger and consensus mechanism that maintain the data in a peer-to-peer manner can bring transparency and traceability to the stored cost data. Researchers have demonstrated the potential and feasibility of blockchain in enhancing construction data accountability for design collaboration, payment management, procurement processes, supply chain management, etc.

However, the application of blockchain for construction cost management, especially from a holistic perspective across different cost-related activities and stakeholders, is still immature. Facilitating construction cost management with blockchain suffers from sensitive data leakage owing to the lack of appropriate access control methods. Construction cost-related data is highly sensitive by nature and should not be exposed to all the stakeholders, while data in the blockchain ledger is transparent to each member in the network. Consequently, unauthorized access to cost-sensitive data leads to undesirable cost data leakage when utilizing blockchain in construction cost management. According to ISO 19650-5:2020, the need to protect confidential construction project data should be taken seriously to prevent unauthorized data access. Traditional access control methods in centralized databases, such as lock-based mechanisms and multilevel relational models, cannot be directly applied in a blockchain network due to the fundamental differences in database architectures (i.e., centralized versus decentralized). In addition, the difference in data model formats, i.e., the E-R data model for centralized databases and the chained data model for a blockchain network, is another barrier to applying conventional access control methods. Thus, the confidentiality of cost-sensitive data in a transparent blockchain network is a matter of concern.

Accordingly, although the risk of data manipulation in a centralized paradigm by using accountability (i.e., data integrity and traceability) concerning existing construction cost management platforms is expected to be improved by blockchain, the transparency of blockchain conflicts with the confidential nature of cost information. Therefore, there is a need for a framework that utilizes blockchain effectively for construction cost management platforms.

SUMMARY OF INVENTION

It is an objective of the present invention to provide systems and methods for construction cost management using blockchain and encryption so as to address the aforementioned shortcomings and unmet needs in the state of the art.

In the present invention, a novel framework based on blockchain and encryption is provided to preserve both data accountability and confidentiality in construction cost management. The proposed new framework involves the development of a cost data model containing the required confidential cost information to facilitate partially transparent recordings on the blockchain. An access control model based on symmetric and asymmetric encryption as well as proxy re-encryption mechanisms is developed to prevent unauthorized access to sensitive cost data on the blockchain and transfer data access in dynamic construction projects (i.e., construction projects involving new members continuously). Subsequently, encryption-integrated smart contracts are developed for automatic and secure cost activities on the blockchain. The framework is validated with a desirable latency (at the millisecond level), throughput (at the hundred level), and storage cost (at the MB level) in three illustrative cost management scenarios. The results indicate that project members can have accountable and confidential cost data for dispute resolution and cost analysis, respectively, as well as efficient cost data access transfer.

To overcome these challenges, this invention presents a novel framework, with the aid of blockchain and encryption methods, to facilitate data accountability and confidentiality amid construction cost management. The specific objectives are:

1) To define a cost data model which identifies non-sensitive cost information that should be transparent to all project members and sensitive cost information that should only be accessible to authorized ones, for traceable and confidentiality-aware cost information management on blockchain;
2) To develop an access control mechanism using customized encryption techniques (i.e., symmetric and asymmetric encryption, proxy re-encryption) to protect sensitive cost information in the proposed cost data model on blockchain transparently and efficiently; and 3) To develop smart contract logic to integrate the proposed encryption-based access control mechanisms with blockchain to support automatic and secure cost management activities.

While trying to have a holistic perspective on construction cost management, this invention focuses on cost information exchange and management and the incurring data accountability and confidentiality problems among project stakeholders.

In accordance with an aspect of the present invention, a system for cost management using blockchain and encryption for reducing computer processing time is provided. The system includes an access interface, a recorder, a determinator, a key generator, an encryptor, and a decryptor. The access interface is configured to provide a platform for users to log in. The recorder is coupled with the platform for recording cost information. The determinator is coupled with the recorder and configured to determine whether the cost information recorded in the recorder is non-sensitive. When the cost information is determined as being non-sensitive by the determinator, the determinator is further configured to trigger a smart contractor module which is able to interact with the determinator to generate and complete a transaction containing the cost information. The cost information is directly uploaded to and recorded on a blockchain network via the smart contractor module. The key generator is coupled with the determinator. When the cost information is determined as being sensitive by the determinator, the key generator is configured to generate a symmetric key randomly. The encryptor is coupled with the key generator and is configure to encrypt the cost information using the symmetric key to obtain ciphertext information and encrypt the symmetric key using public keys to obtain encrypted keys. The encryptor sends the ciphertext information to the blockchain network via the smart contractor module for recording. The decryptor is coupled with the platform for decrypting the encrypted keys using private keys corresponding to the public keys. When the decrypting fails, an access request is denied by the decryptor. When the decrypting successes, the decryptor is permitted to use the symmetric key K to decrypt the ciphertext information.

In some embodiments, the encryptor is further configured to send the encrypted keys to the smart contractor module, and the system further includes a key destroyer coupled with the encryptor configured to destroy the symmetric key in a memory after the smart contractor module receives the encrypted keys.

In some embodiments, the key destroyer destroys the symmetric key to erase it by overwriting the memory multiple times with other unrelated information, comprising random bits or all zero or one bits.

In some embodiments, the system further includes a re-encryptor coupled with the plat form for generating a re-encryption key using a sender private key and a receiver public key and for encrypting at least one of the encrypted keys using the re-encryption key to obtain a re-encrypted key, which is to be decrypted by using a receiver private key.

In some embodiments, the re-encryptor is permitted to decrypt the re-encrypted key using the receiver private key so as to obtain a key for decrypting the encrypted ciphertext information.

In some embodiments, the platform allows different stakeholders to log in via the access interface, enabling multiple simultaneous accesses.

In some embodiments, the platform is made for a construction project such that the access interface is further configure to assign construction-related characteristics for the users.

In some embodiments, the construction-related characteristics include roles in owners, designers, consultants for quantity surveyors (QS), contractors, contractors QS, or combinations thereof.

In some embodiments, the determinator triggers the smart contractor module to activate smart contract functions and sign smart contracts provided by the smart contractor module, comprising encryption key distribution, cost data recording, cost data retrieval, and cost data access transfer.

In some embodiments, the encryption key distribution is activated, generating and sharing public keys for all members in the blockchain network, enabling users to utilize them for access control.

In some embodiments, the cost data recording is activated for transactions containing identified planned and actual cost-related information, which is recorded in the blockchain network while preserving confidentiality of cost-sensitive data.

In some embodiments, the cost data retrieval is activated for the recorded transactions on the blockchain network, enabling retrieval as authentic data sources for cost analysis and providing uncontroversial evidence in case of disputes, all while preventing leakage of cost-sensitive data.

In some embodiments, the cost data access transfer is activated to enable secure and efficient transfer of decryption abilities for previous cost-sensitive data to a new member joining the blockchain network, provided the new member has the right to access the cost-sensitive data.

BRIEF DESCRIPTION OF DRAWINGS

Embodiments of the invention are described in more details hereinafter with reference to the drawings, in which.

DETAILED DESCRIPTION OF THE INVENTION

Figure 1:
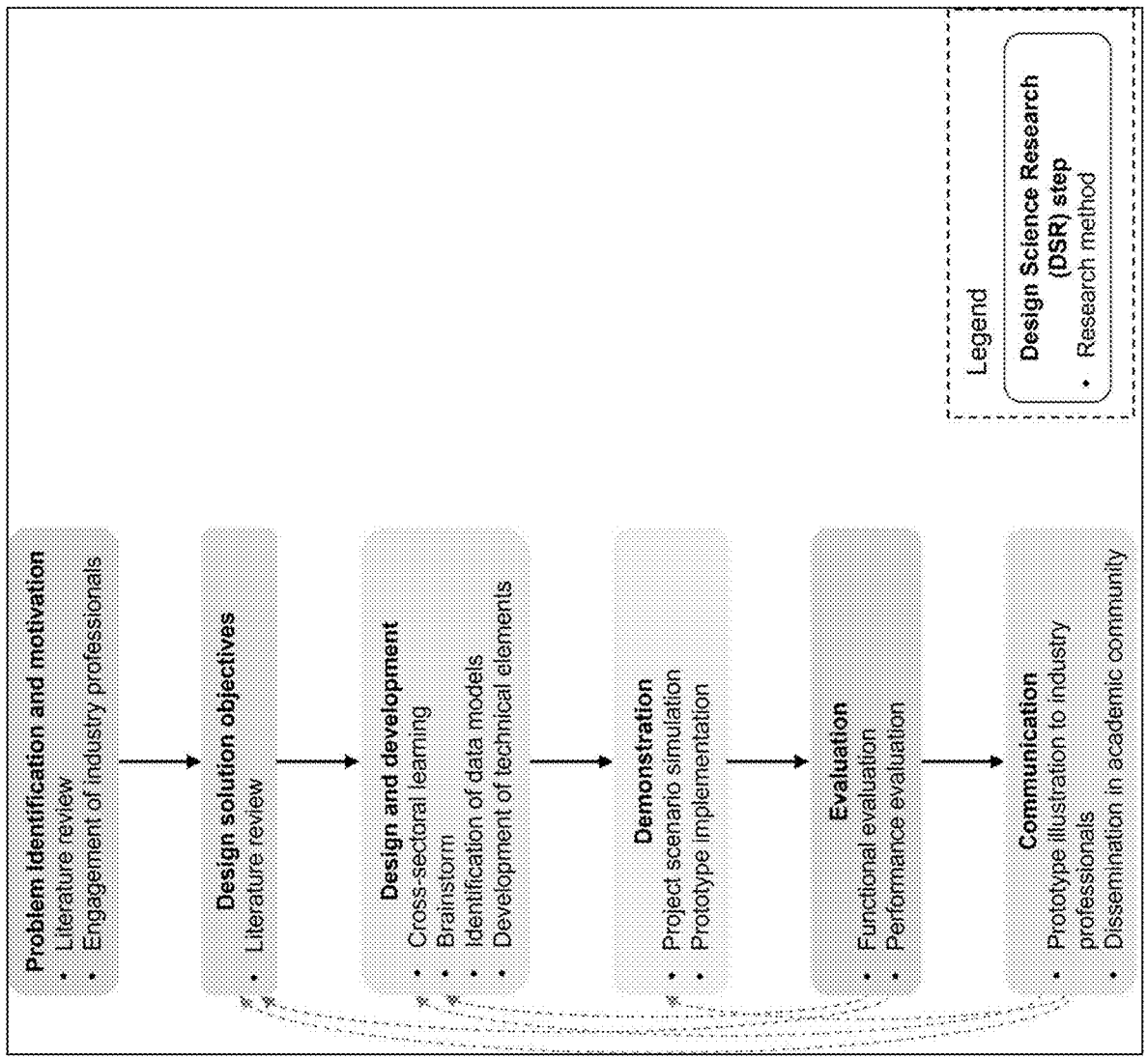
FIG. 1 shows the design based on the DSR approach which includes six research steps according to some embodiments of the present invention.

In the following description, systems and methods for construction cost management using blockchain and encryption and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

In the following descriptions: introduction for the use of blockchain in construction for data accountability and access control methods on blockchain for data confidentiality, and identifies the research gaps to be addressed in the present invention; the research method is then described; the proposed blockchain and encryption-based construction cost management framework is introduced. There are three illustrative examples for validating the functionality and performance of the proposed framework. Next, the further discussion and the conclusion are provided.

Blockchain is marked by distributed architecture and immutable data records. In a blockchain network, each member keeps a ledger that stores a complete copy of records uploaded on the blockchain. These members maintain the same records through consensus mechanisms without third parties such as "central authority". The hash function irreversibly maps any content (e.g., block records) to a unique hash value, which links a block to its predecessor to form a chained sequence. Such a method prevents data mutability since block record modifications result in hash value changes, which would invalidate all subsequent blocks in the chain and be noticed by other members.

Existing studies about integrating blockchain in construction projects are mainly twofold: (1) application of blockchain in construction to ensure data accountability; and (2) methods to preserve data confidentiality in the distributed and transparent blockchain.

Blockchain for Data Accountability in Construction

Various studies have explored the use of blockchain to tackle the data accountability problem in the construction industry. For example, one of relevant works leverages blockchain in a Building Information Modeling (BIM)-based collaborative environment to enhance traceability of design data exchange and archiving. One of relevant works integrates blockchain into a web-based system to improve the transparency and liability of design change records. One of relevant works proposes a blockchain-enabled Internet of Things (IoT) system for uncontroversial allocation of liabilities for damaged materials in the construction supply chain. One of relevant works introduces permissioned blockchain in modular construction supply chain management, which can promote the usage of blockchain through effective service-oriented system architectures. Through utilizing blockchain and smart contracts, construction quality information can also be managed with better transparency and traceability to reduce disputes among stakeholders. For blockchain applications in construction cost management-related purposes, a few studies have investigated blockchain in construction payment processes. For instance, one of relevant works integrates blockchain-based smart contracts with BIM for automatic, transparent, and traceable payment and contract management. One of relevant works develops a blockchain-based smart contract system for construction projects' payment freezing and disbursement cycle. Results showed that it could enhance payment certainty and efficiency without introducing radical changes to the industry practice. Some of relevant works develop blockchain and smart contract-based progress payment systems and validated the feasibility through real construction data and structured interviews with construction stakeholders. The benefits of blockchain and smart contracts in reducing disputes and automating payment approvals are appreciated by the professionals. The previous studies, including those on blockchain-based construction payment processes, have demonstrated that blockchain is a promising solution to address the data accountability issue in construction cost management. However, they mainly focused on data trust and traceability problems in construction data recording and storage. A holistic investigation on exchanging and managing the information stored on the blockchain in construction cost management is still lacking, particularly for the identification of activities and data models with cost-specific characteristics to facilitate cost information exchange on blockchain among different stages and stakeholders.

Access Control Methods for Data Confidentiality on Blockchain

Blockchain is inherently transparent so that each member can access and validate the data in the ledger. However, this contradicts with confidentiality requirements of some domain-specific applications (e.g., sensitive design collaboration, construction cost management) during the data exchange and management. Thus, access control methods are needed to preserve project data confidentiality on the blockchain. Traditional access control methods are inappropriate for blockchain because of its chained data structure and decentralized architecture. For instance, lock-based mechanisms that freeze certain data (e.g., partial rows in a table) are commonly adopted to prevent unauthorized data access. The role-based access control (RBAC) model that enables fine-grained access settings for different users is also widely used to ensure that the users can only access the data assigned to them. However, it is unreasonable to set up access to every block in the blockchain since there are numerous and different blocks with sensitive or non-sensitive data. In addition, it is difficult to synchronously manage access to the repositories of multiple members as the data is stored in a distributed way. One of relevant works stores BIM data in hash values in the blockchain to protect confidentiality. However, such an approach prevents project members from obtaining source data for further applications from the blockchain. One of relevant works uses a different blockchain channel to manage confidential project data, which makes blockchain development and data management more complex. One of relevant works applies asymmetric encryption to protect sensitive design BIM data on the blockchain. Nevertheless, it is inefficient regarding the practical needs in construction projects (e.g., the need for continuous new members in a project who deserve access to previously encrypted data). The Hyperledger community suggests placing hashes of private data in the main ledger (on-chain) and source data in a separate repository (off-chain) that connects to the main blockchain. However, the data consistency between on-chain and off-chain and data exchange in the distributed network are still matters of concern. Thus, developing a practical and efficient access control method to protect data confidentiality in blockchain-based construction cost management is still challenging.

To address these problems, this invention develops a blockchain and encryption-based framework to ensure accountable and confidential cost information flows in construction projects and enable practical and efficient cost data access control on the blockchain, leading to a reduction in computer power consumption during the data accessing.

Regarding the research method, the approach provided by the present invention adopts the Design Science Research (DSR) method, an exploratory and analytical approach that creates innovative artifacts (e.g., frameworks, algorithms, models) to address identified problems and contribute to the body of knowledge. FIG. 1 shows the design based on the DSR approach which includes six research steps according to some embodiments of the present invention. Through a literature review on construction cost management and discussion with professional quantity surveyors, the problem of lacking cost data accountability and confidentiality in construction projects is identified. It is not uncommon to see researchers and practitioners actively adopt advanced digital platforms for construction cost management while exposing the cost data to cybersecurity risks. The objectives are defined and refined by periodic literature reviews on relevant developments for preserving cost data accountability and confidentiality in construction projects. In the design and development step, cross-sectoral learning is conducted through another round of literature review to design a blockchain and encryption-based construction cost management framework. The database security sector, where access control is a major topic to prevent data breaches by unauthorized people in database systems, is focused to get insights on access control methods and applications, and their possible integrations with blockchain. General cost data models are identified from typical cost management processes to clarify the information to be recorded on the blockchain, followed by the development of key blockchain and encryption elements to support accountable and confidential cost information management. In the demonstration step, the developed prototype is implemented in simulated typical project scenarios where cost data accountability and confidentiality are needed.

Figure 2:
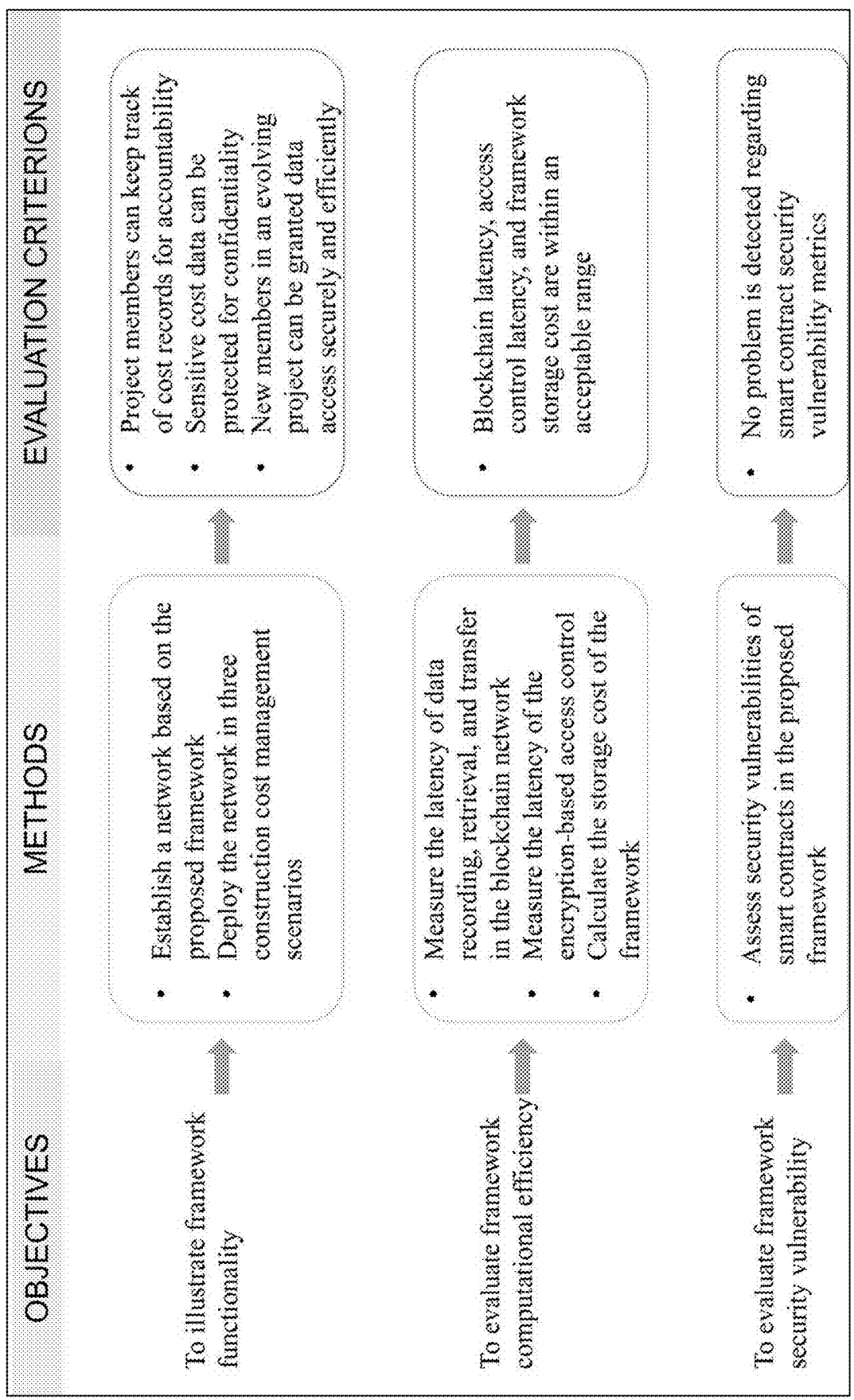
FIG. 2 shows evaluation of functionality, computational performance and security of the proposed new framework according to some embodiments of the present invention.

The functionality, computational performance and security are then evaluated in the simulated cost management scenarios according to the methods and criterions in FIG. 2 which shows evaluation of functionality, computational performance and security of the proposed new framework according to some embodiments of the present invention. Finally, a prototype demo is illustrated to professional quantity surveyors to gather practical feedback. Note that the six steps are interactive and iterative processes that continuously refine the developed framework.

Figure 3:
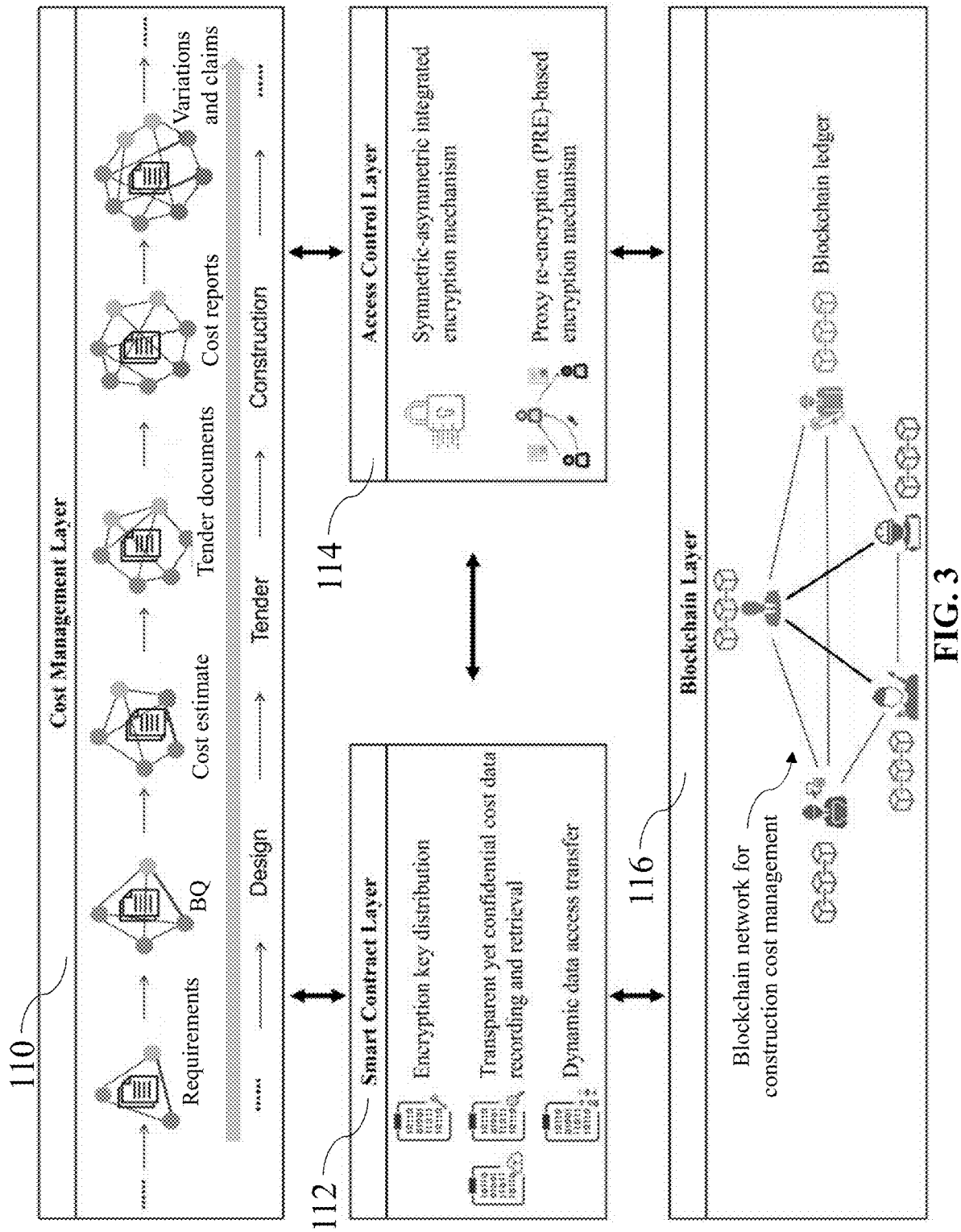
FIG. 3 depicts an overview configuration of the proposed framework according to one embodiment of the present invention.

A blockchain and encryption-based construction cost management framework is provided as follows. FIG. 3 depicts an overview configuration of the proposed framework according to one embodiment of the present invention. As shown in FIG. 3, the proposed new framework includes a cost management layer 110, a smart contract layer 112, an access control layer 114, and a blockchain layer 116. The cost management layer 110 aims to streamline the information flows of a construction project as different stakeholders are gradually involved in generating and exchanging cost-related information (e.g., cost estimate, actual cost records, variations and claims) across different stages in the project. Confidentiality-aware cost activities and data models are identified from this layer for partially transparent recording on blockchain to support cost data accountability and confidentiality. Considering construction project characteristics (e.g., new members are continuously involved along the project delivery), symmetric-asymmetric encryption integrated, and proxy re-encryption-based mechanisms are designed to create an efficient and dynamic access control layer over confidential cost data in the blockchain layer. Only authorized members can access confidential cost data, and the new members during construction can be granted data access efficiently through the re-encryption of the proxy. Finally, the smart contract layer develops different smart contracts integrating encryption to interact among the cost management, blockchain, and access control layers for automatic and secure cost activities. Smart contracts are trusted computer programs that can automatically self-execute when predefined conditions are met. Details of the framework are described below.

It is noted that there are three types of blockchain: public, private, and consortium. The stored data in a public blockchain network is transparent to every member and can hardly be tempered with. However, the privacy level is low since every member in the network can view the recorded data. Moreover, the mining-based consensus mechanism in the public blockchain requires high computing resources, resulting in low scalability. In the private blockchain network, a single organization takes the lead and only pre-approved members can engage. It is designed with high privacy and scalability because of the more centralized characteristic, but it sacrifices the transparency and security of the recorded data. A consortium blockchain allows multiple authorized organizations to participate with different levels of access permissions to the recorded data. It is designed with various governance structures to provide moderate scalability and is more auditable than the solo-lead private blockchain. In construction projects, only registered project stakeholders are allowed to enrol and different stakeholders may have different information requirements and privacy control. Meanwhile, the transparency and security of the recorded data are highly demanded to make it more auditable. Therefore, the consortium blockchain is adopted in this invention to suit the construction project characteristics. Hyperledger Fabric is chosen to develop a consortium blockchain considering its diverse security-enhanced resources and tools, as well as its suitability for complex information requirements in the construction industry.

Confidentiality-aware Cost Data Model is described below.

1.1) Identification of Cost-Related Information

Figure 4:
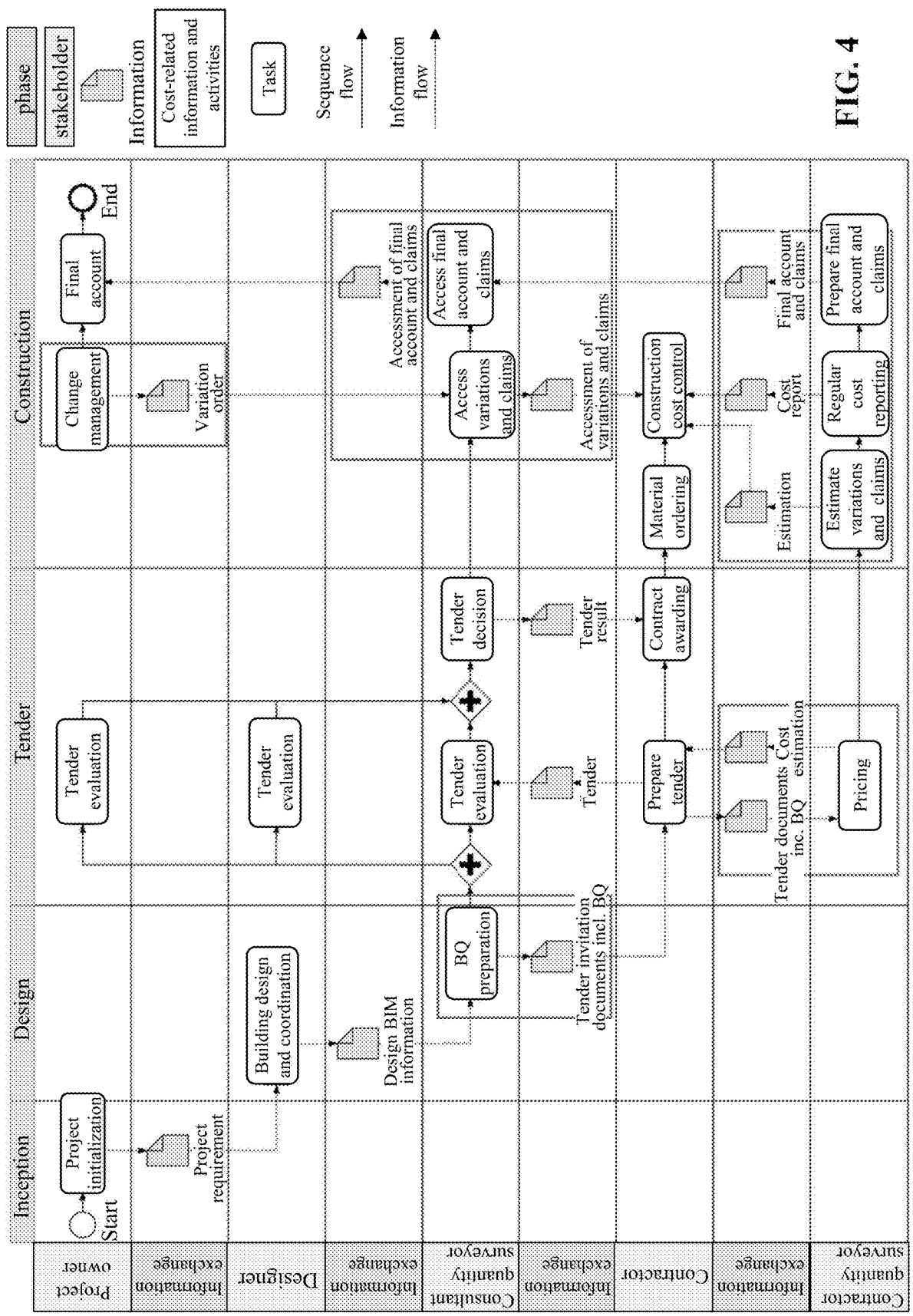
FIG. 4 shows a typical process map of construction cost management to identify the cost-related information that needs to be accountable and confidential.

FIG. 4 shows a typical process map of construction cost management to identify the cost-related information that needs to be accountable and confidential. It includes the major cost information flow and data exchange across different tasks and stakeholders based on existing practices and inputs from cost experts. Directly related cost information and activities (e.g., bills of quantities (BQ) in the design stage, cost report in the construction stage) are highlighted to show the focus of the present invention in the process. The owner initializes the project and defines the project requirements (e.g., project scope, cost target) for designers to conduct building design and coordination. The design information (e.g., design drawings and/or BIM models) is then delivered to the consultant quantity surveyor to prepare bills of quantities (BQs), which would be part of the tender invitation documents sent to contractors. The contractors exchange tender-related documents (including BQs) and cost estimation results with the appointed contractor quantity surveyors to prepare the tenders for evaluation. Next, the selected contractor starts the actual construction according to the contract.

Figure 5:
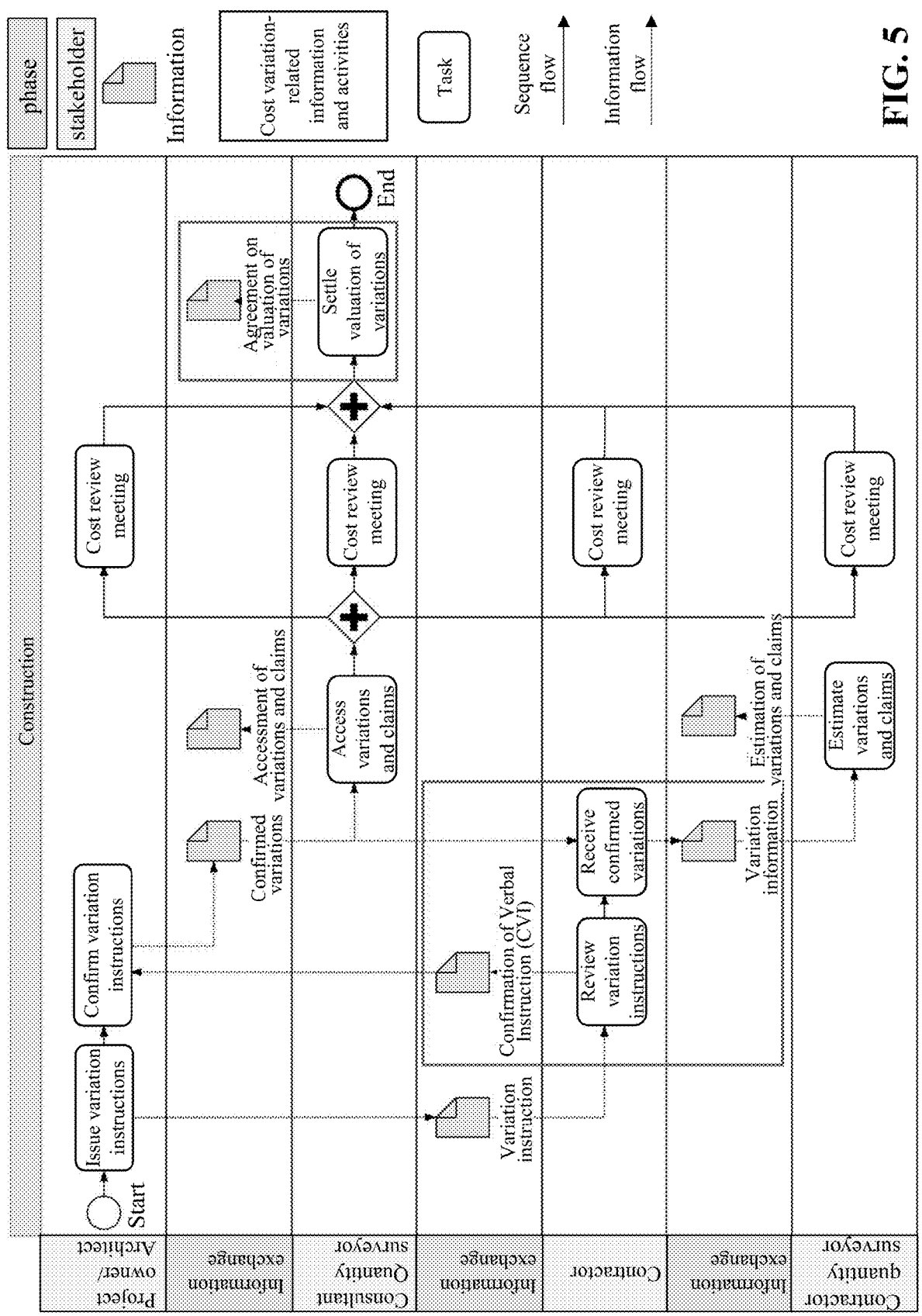
FIG. 5 shows the process of valuation of construction variations and claims in detail.

At the construction stage, the contractor quantity surveyor prepares regular cost reports which contain actual construction cost information (e.g., material, mechanical, and labor costs, work item quantities) and cost analysis results (e.g., cost forecasting, cost adjustment suggestions) for the contractor to perform cost control. Meanwhile, it is not uncommon to see that the project owner issues variation orders which incur cost changes during construction. FIG. 5 shows the process of valuation of construction variations and claims in detail. The cost variation-related information and activities (e.g., confirmation and evaluation of variations) are highlighted as the focus in the process. The project owner or representative architect first issues variation instructions, based on which the contractor requests a confirmed version, including detailed variation instructions and endorsements, etc. The consultant and contractor quantity surveyors estimate the variations (e.g., quantity and unit rate variations due to changes in design and material specification) for the project owner and contractor, respectively. Then, regular cost review meetings are held among these stakeholders to settle any variations. The agreement containing valuation information, such as variation items, total variation cost and detailed cost breakdown, should be well recorded to avoid disputes in the final accounting. Finally, with the help of consultants and contractor quantity surveyors, final accounting is conducted to close the project, as shown in FIG. 4.

Therefore, construction cost management is a highly collaborative process with multiple stakeholders producing and exchanging cost-related information, which directly impacts the stakeholders' financial interests. This characteristic drives the incentive to unwittingly manipulate bidding and cost information to maximize one's own profits, which can easily incur financial disputes. With the help of the immutability and transparency features of the blockchain network, the concerns on cost data integrity and traceability can be alleviated. In addition, some cost information (e.g., detailed cost breakdown in cost reporting) is highly sensitive by nature. Sensitive cost information needs to be confidential while being managed transparently. Thus, encryption methods are leveraged to cater for the confidentiality characteristic of construction cost management.

Through this identification process, cost-related information and related information exchange among various stakeholders and stages are recognized, providing the basis to determine the cost data model for blockchain and encryption-based construction cost management.

1.2) Establishment of Data Model for Cost-Related Transactions on Blockchain

Figure 6:
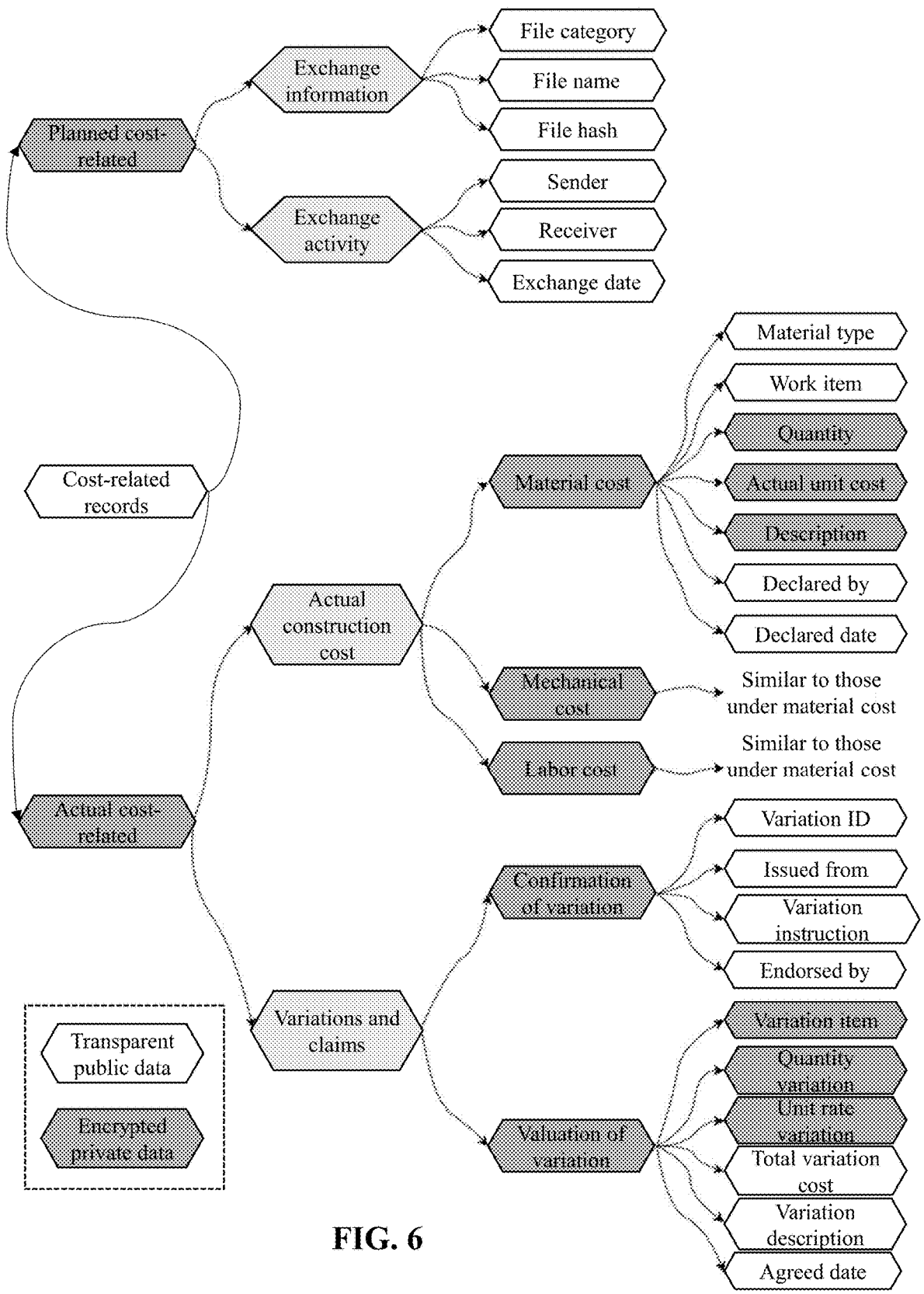
FIG. 6 depicts confidentiality-aware cost data model for blockchain-based cost information management according to one embodiment of the present invention.

As provided the process map, the identified information flows in construction cost management can be extracted to establish a confidentiality-aware cost data model, which is then leveraged to determine cost-related transaction data on the blockchain. As shown in FIG. 6, depicting confidentiality-aware cost data model for blockchain-based cost information management according to one embodiment of the present invention, the data model covers planned and actual cost-related information. The planned cost-related information refers to the exchange activities and the information in them during the inception, design, and tender stages. As afroed-described, different stakeholders exchange various cost-related documents in these stages, producing planned costs that can determine subsequent project arrangements. It is not uncommon to see malicious intents to compromise the integrity of the exchanged data in construction projects, resulting in deviations of cost bases. Such security risks severely affect construction projects regarding project members' money and reputations. Thus, the cost-related exchange information (i.e., information about exchanged files and exchanging parties in FIG. 6) should be protected with traceability and integrity for trusted cost results and uncontroversial allocations of liabilities in the planning stages.

The actual cost-related information refers to actual cost-related records and/or evidence during construction. As afroed-described, actual cost information (e.g., material, mechanical, labor costs, work item quantities) occurs in construction and is recorded in cost reports for the contractor to conduct cost control. Such information needs to be traceable for accountability. On the other hand, some of it (e.g., quantity, actual unit cost, description) may reveal the contractor's performance and competitive advantages and hence should be confidential to irrelevant parties. Therefore, this part of the information is incorporated into the data model and is deemed partially confidential, as shown in FIG. 6. For the variations and claims, the confirmation information (e.g., issuing parties, instructions, endorsements) should be protected with traceability to become trusted variation evidence and thus is included in the data model. Similar to the actual cost information, the valuation of variations and claims needs to be accountable, while a part of it (e.g., detailed cost breakdown) should be confidential to prevent unauthorized access since it may disclose preferential strategies of the project owner or contractor (e.g., special concession/discounts to maintain a good relationship strategically). Thus, the valuation information of variations is recorded in a partially confidential way in the data model shown in FIG. 6.

Figure 7:
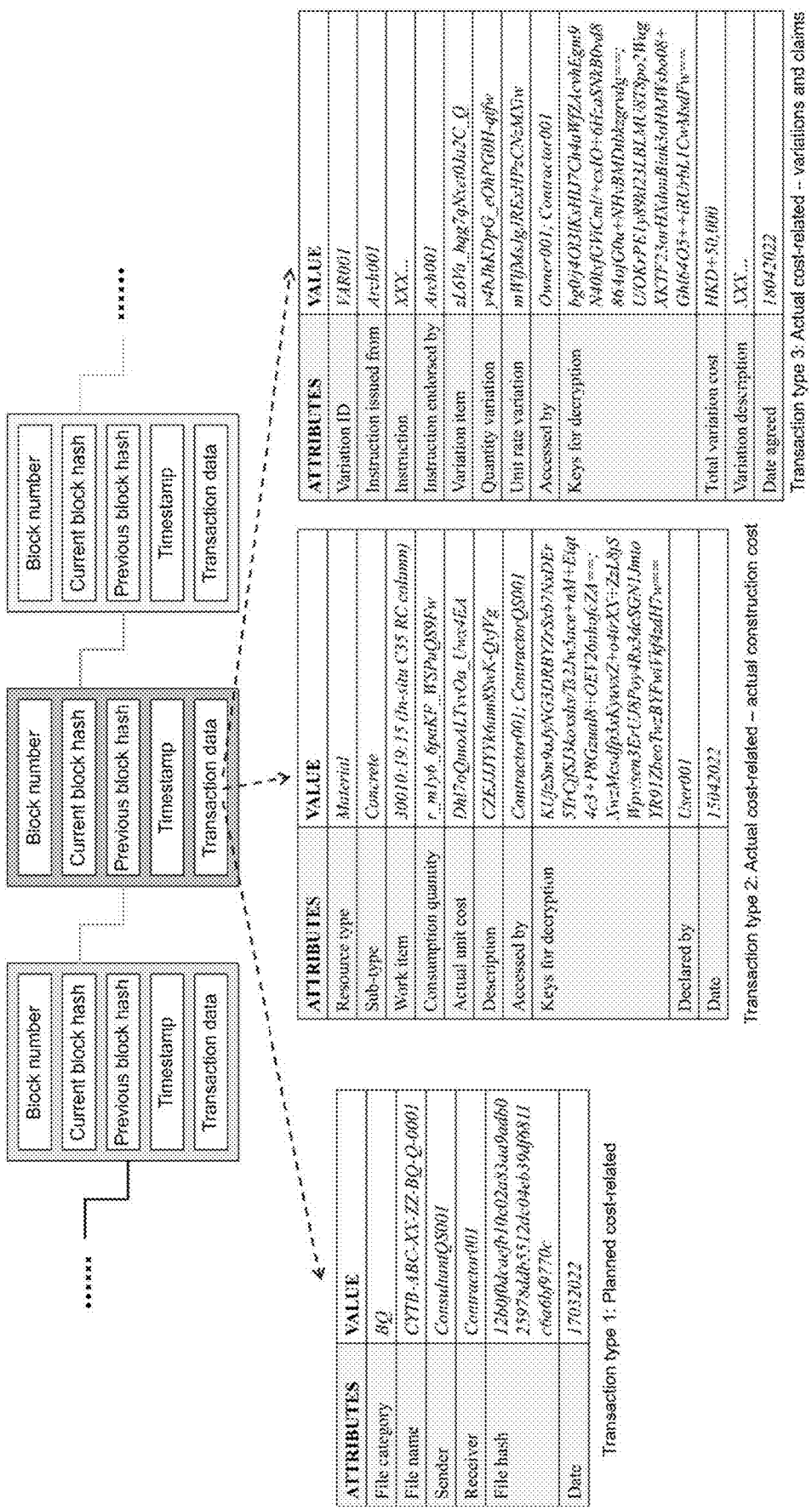
FIG. 7 is an illustration of the blockchain transaction data according to one embodiment of the present invention.

FIG. 7 is an illustration of the blockchain transaction data according to one embodiment of the present invention. As concerning the developed confidentiality-aware cost data model, three types of transactions are proposed to share the information on planned costs, actual construction costs, and variations and claims on the blockchain, as shown in FIG. 7. The actual values in the transactions are for illustrative purposes. The cost information is recorded in the formats of these transactions, shared in a blockchain network, and stored in the ledger for construction cost management activities. The accessed by and keys for decryption fields record the access control information for confidential cost data, and are introduced in the following subsections.

Efficient and dynamic access control model is described below.

Figure 8A:
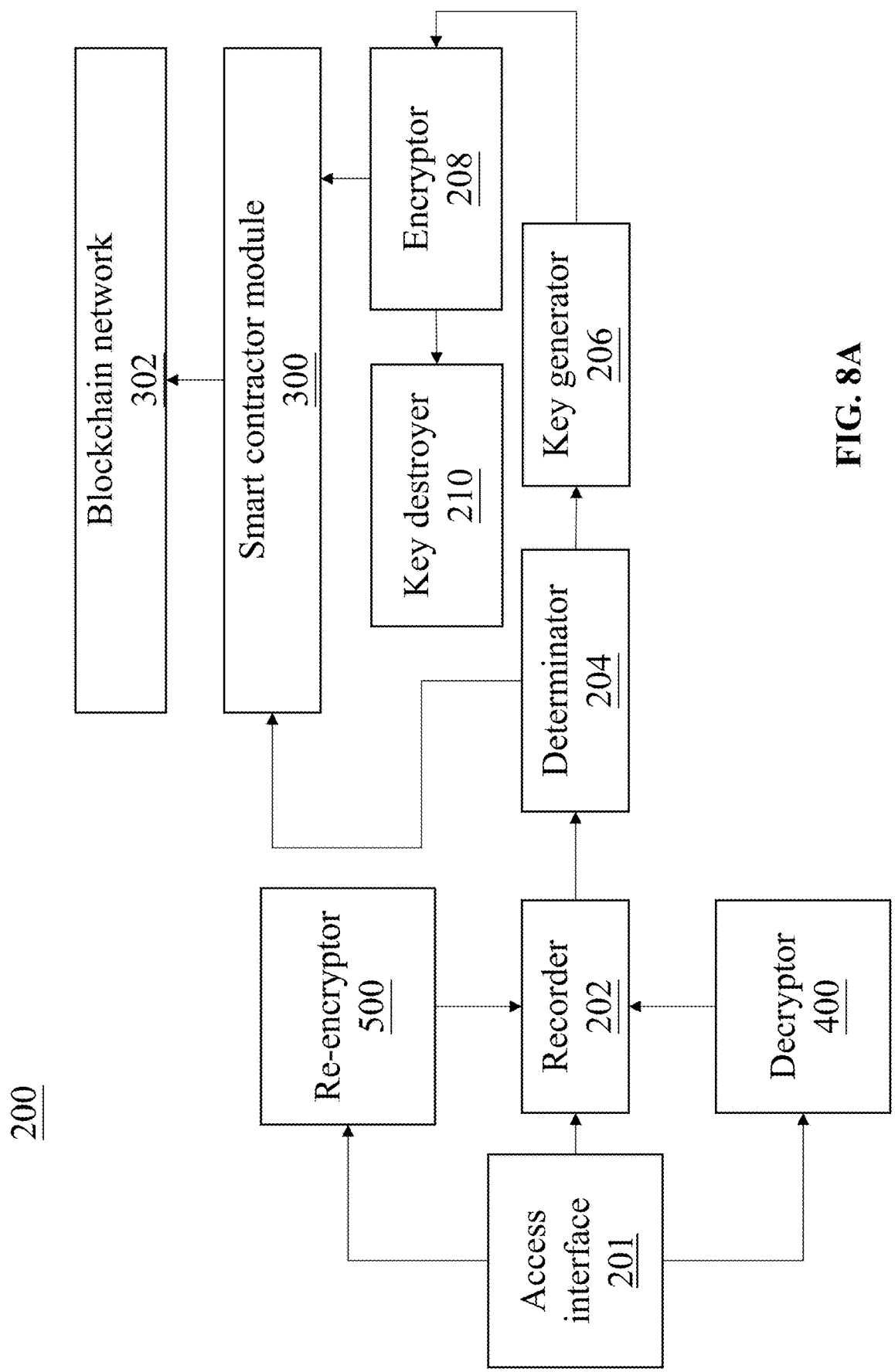
FIG. 8A depicts a system for cost management using blockchain and encryption according one embodiment of the present invention.

FIG. 8A depicts a system 200 for cost management using blockchain and encryption according one embodiment of the present invention. The system 200 includes an access interface 201, a recorder 202, a determinator 204, a key generator 206, an encryptor 206, a key destroyer 210, a smart contractor module 300, a blockchain network 302, a decryptor 400, and a re-encryptor 500, which are electrically connected/coupled together. From the access interface 201, the processing may go to the next stage via the decryptor 400 or the re-encryptor 500 and then the recorder 202, or directly to the recorder 202. Specifically, from the access interface 201 there three paths, path I, path II, and path III, for processing the requirements for the cost management.

Figure 8B:
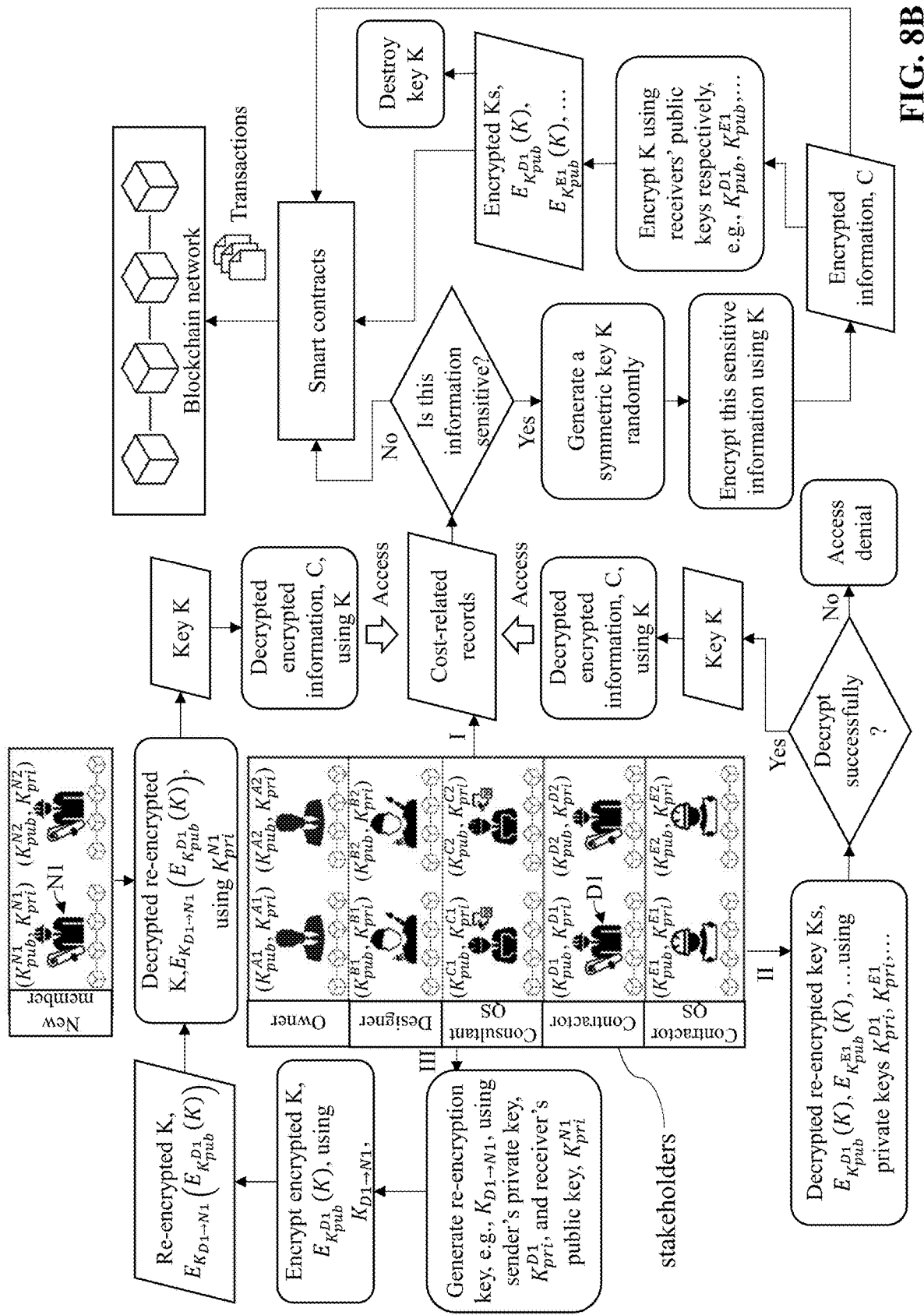
FIG. 8B depicts a flowchart of an efficient and dynamic access control model operated by the system according one embodiment of the present invention.

FIG. 8B depicts a flowchart of an efficient and dynamic access control model operated by the system 200 according one embodiment of the present invention. The workflow starts from the stakeholders and follows the sequence of path I>>II>>III. The stakeholders can operate the access interface 201 to get the workflow for the cost management started, such as logging in a cost management platform via the access interface 201. In one embodiment, the platform allows different stakeholders to log in via the access interface 201, enabling multiple simultaneous accesses. For example, the stakeholders may include owners, designers, consultants QS, contractors, contractors QS. It can be understood that although the embodiments herein are illustrated using construction-related examples, the protection scope of the present disclosure (e.g., the claim scope) should not be limited solely to construction, as the framework is applicable to many other fields that involve cost management.

As afore-mentioned, sensitive cost data should be only accessed by certain project members to preserve confidentiality. In the present invention, a novel method is provided to create an access-controlled blockchain-based construction cost management environment. As shown in FIG. 8B, the proposed access control model has two parts: (1) symmetric-asymmetric integrated encryption mechanism for secure and efficient access control, which includes encryption and decryption to protect or allow access to sensitive data, respectively; (2) proxy re-encryption-based mechanism for secure and dynamic access transfer, which is to re-encrypt the data for transferring the access. Details are provided in the follows.

Figure 9B:
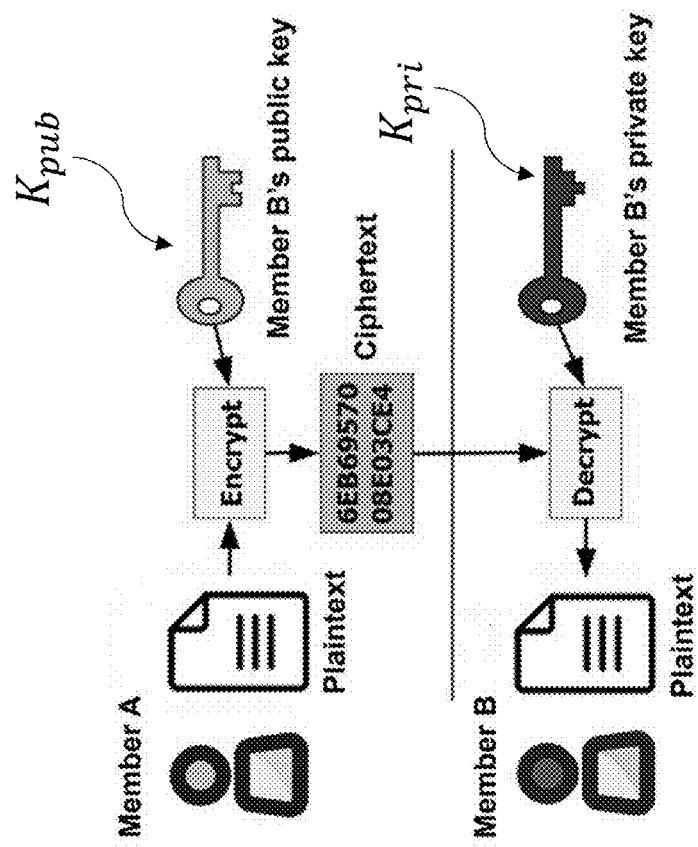
FIG. 9A depicts a schematic drawing for symmetric encryption and FIG. 9B depicts a schematic drawing for asymmetric encryption.
Figure 9A:
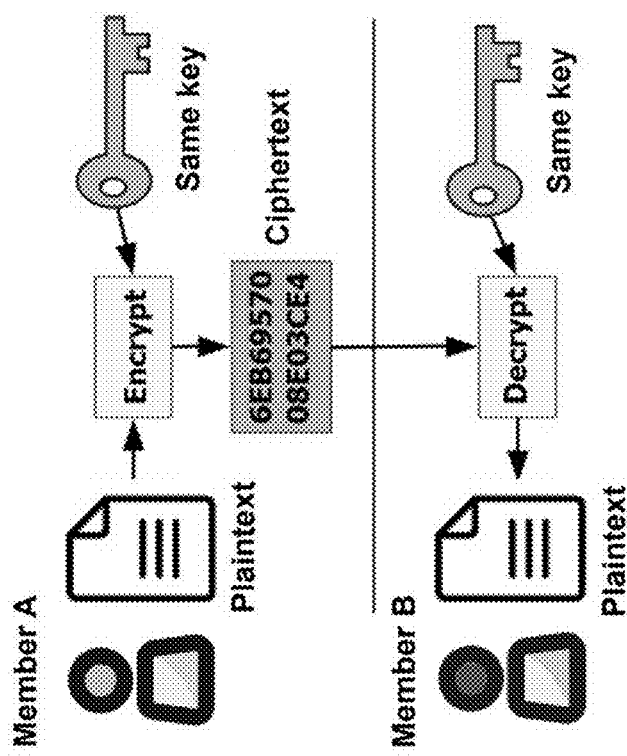

2.1) Symmetric-Asymmetric Integrated Encryption Mechanism for Secure and Efficient Access Control FIG. 9A depicts a schematic drawing for symmetric encryption and FIG. 9B depicts a schematic drawing for asymmetric encryption. There are three types of encryption techniques: hash function, symmetric encryption, and asymmetric encryption. The hash function is unsuitable since it is irreversible, while encrypted cost information may need to be retrieved later. As FIG. 9A shows, symmetric encryption uses the same key to encrypt the plaintext and decrypt the ciphertext between two or more parties. It is fast but has the risk of key compromise. In asymmetric encryption, as shown in FIG. 9B, every member generates a public key ($K_{pub}$) and private key ($K_{pri}$). $K_{pub}$ is distributed publicly while $K_{pri}$ is kept secretly. Any member can encrypt a plaintext with the intended receiver's $K_{pub}$, but only the receiver's $K_{pri}$ can decrypt the corresponding ciphertext. This allows secure key management despite the relatively low speed compared with symmetric encryption.

The information exchange in construction projects usually has the characteristic of one-to-many. In other words, one piece of confidential information can be accessed by multiple stakeholders. For example, the actual unit cost of a work item can be accessed by several contractor members and contractor quantity surveyors. Symmetric encryption has a high risk of key compromise in such a multi-party communication. For asymmetric encryption, it is inefficient to encrypt the information multiple times using public keys of multiple receivers (i.e., project members who can access this sensitive cost information). The multiple encrypted versions of the same piece of information also occupy unnecessary storage space. Therefore, considering the high efficiency of symmetric encryption and secure key management of asymmetric encryption in such a one-to-many situation, the proposed access control model integrates symmetric and asymmetric encryption mechanisms to protect confidential cost information as illustration of in FIG. 8A and FIG. 8B with the description as follows.

As shown in FIG. 8A and FIG. 8B, each project member (i.e., stakeholders) logs in the platform via the access interface 201 and accordingly has a pair of keys assigned by the platform via the access interface 201.

In FIG. 8B, various symbol are defined as below:

K stands for Key; E stands for Encrypt. K is symmetric encryption key; $K_{pub}^{X}$ is member X's public key; $K_{pri}^{X}$ is member X's private key; $E_{K_{pub}^{D1}}(K)$ is encrypted K using member X's public key; $K_{X \to Y}$ is re-encryption key that is used to re-encrypt the message that is intended for member X so that it can be decrypted by member Y; and $E_{K_{X \to Y}}(E_{K_{pub}^{D1}}(K))$ is result after re-encrypting the encrypted K using the re-encryption key.

Furter more, the illustration of FIG. 8B contains part one with path I and path II and part two with path III, in which: part one is symmetric-asymmetric integrated encryption mechanism for secure and efficient access control, including path I as encryption to protect data and path II as decryption to access data; and part two is proxy re-encryption (PRE)-based mechanism for secure and dynamic access transfer, including path III with re-encryption to transfer access.

In the path I in the part one, after cost information is uploaded to the recorder 202 for record, the determinator 204 is configured to determine whether the uploaded cost information is non-sensitive. If the uploaded cost information is determined as being non-sensitive by the determinator 204, the determinator 204 can trigger the smart contractor module 300 which can interact with the determinator 204 to generate and complete a transaction (e.g., the illustration of FIG. 7) containing the cost information; then the cost information is directly uploaded to and recorded on the blockchain network 302 by the smart contractor module 300 (i.e., it directly goes to the end stage of the path I in the part one).

Otherwise, if the uploaded cost information is determined as being sensitive by the determinator 204, a symmetric key K is generated randomly and used to encrypt the cost information by the key generator 206, making the corresponding ciphertext then uploaded to the blockchain (e.g., the blockchain network 302). Specifically, after generating the symmetric key K by the key generator 206 and before uploading the cost information/ciphertext to the blockchain, the encryptor 208 is configure to encrypt the cost information using the symmetric key. When encrypting the information by the encryptor 208 using the symmetric key, the symmetric key K is further encrypted using receivers' public key $K_{pub}$. The encrypted versions of the symmetric key K for different receivers (e.g., $E_{K_{pub}^{D1}}(K)$, $E_{K_{pub}^{E1}}(K)$), where E stands for Encrypt) are then recorded on blockchain (i.e., the blockchain network 302, through the keys for decryption field in the transaction formats via the smart contractor module 300 as the illustration of FIG. 7).

Afterward, in one embodiment, the symmetric key K is destroyed by the key destroyer 210. Since the symmetric key K is in the memory instead of storage and is designed to be immediately destroyed after the encryption process, it can be erased by overwriting it multiple times with other unrelated information using the key destroyer 210 (e.g., random bits or all zero or one bits).

At later stages, as the path II in the part one, if a project member, e.g., Contractor D1, operates the access interface 201 and wants to access this sensitive cost information, the project member needs to use his/her private key $K_{pri}^{D1}$ to decrypt $E_{K_{pub}^{D1}}(K)$ (i.e., the encrypted K using D1's public key) first via the decryptor 400 to get the symmetric key K. If the decryption operated by the project member at the decryptor 400 succeeds, the obtained symmetric key K is used to decrypt the ciphertext to get the original information by the decryptor 400 and then the decryptor 400 has the process enter the path I in the part one, such as going to the recorder 202 and then the determinator 204 for information accessing. Otherwise, the access request is denied by the decryptor 400, indicating that D1 should not have data access.

Figure 10:
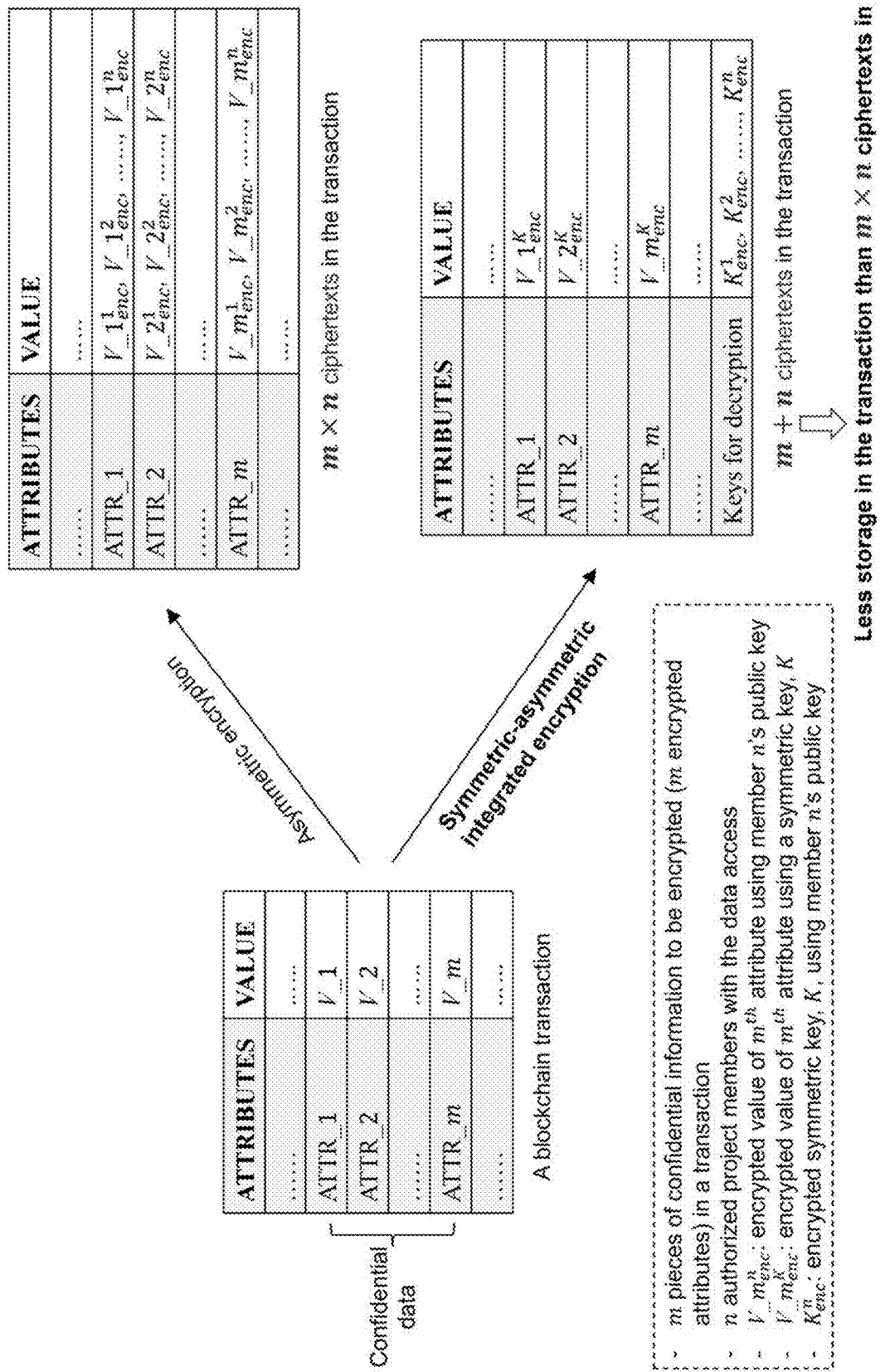
FIG. 10 depicts storage efficiency of the symmetric-asymmetric integrated encryption mechanism according to one embodiment of the present embodiment.

In such an integrated way, symmetric encryption makes the encryption and decryption faster and asymmetric encryption enables easy and secure key management. In addition, the way to encrypt one symmetric key to produce one ciphertext instead of the same piece of information for multiple project members to make multiple ciphertexts requires less storage space, as shown in FIG. 10, depicting storage efficiency of the symmetric-asymmetric integrated encryption mechanism according to one embodiment of the present embodiment. As such, computer processing time is speeded up and it achieves a reduction in computer power consumption during the encryption and decryption process.

Regarding the path III in the part two, which refers to proxy re-encryption-based mechanism for secure and dynamic access transfer, more descriptions are as follows.

Apart from the one-to-many characteristic, construction projects also have the practical need for dynamic access transfer (i.e., transfer data access to new members continuously involved in construction projects) for confidential information. It is not uncommon to see new members getting involved in the middle of a project and requiring access to data that was encrypted earlier. Due to the absence of these new members' public keys in the encryption of the data at earlier stages, they cannot use their private keys to decrypt the data. The traditional decrypt-and-encrypt method (i.e., decrypts the data using private keys of current members who have access and then encrypts using new members' public keys) raises considerable workloads for project members.

In addition, those considerable workloads for project members have the operated computer process the programs slowly. To address this issue, a proxy re-encryption-based mechanism is designed to support the dynamic access control, thereby speeding up the operated computer for program processing.

Compared with other ciphertext-based methods, proxy re-encryption permits a third party (i.e., the proxy) to alter a ciphertext that was encrypted for one party so that it can be decrypted by another (i.e., re-encrypt without decrypting), without the third party being able to learn anything about the original information. This feature minimizes the workload for the data owner while ensuring the security of the data access transfer, which is more practical for the construction industry since construction projects are often in tight schedules and project members may not be familiar with cybersecurity concepts and operations.

Figure 11A:
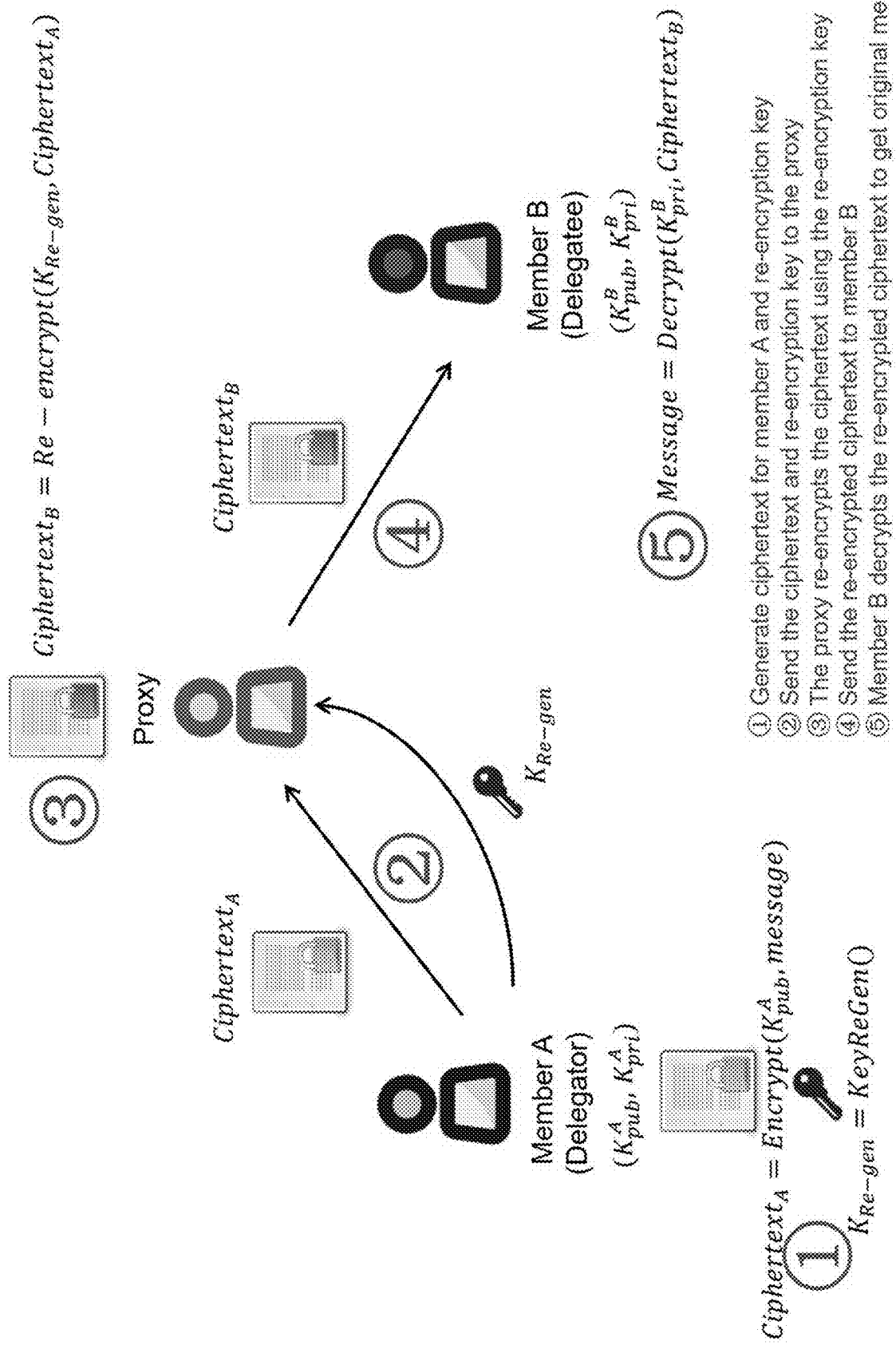
FIG. 11A shows the general concept of proxy re-encryption.

FIG. 11A shows the general concept of proxy re-encryption. In the beginning, a message is encrypted using member A's public key, $K_{pub}^A$, to generate Ciphertext$_A$ that can only be decrypted by member A. In a proxy re-encryption scheme, a re-encryption key, $K_{Re-gen}$, would be generated to re-encrypt Ciphertext$_A$ (i.e., the ciphertext for member A) to produce another ciphertext, Ciphertext$_B$, for member B. Member B can then decrypt Ciphertext$_B$ using his/her private key to get the original message.

Figure 11B:
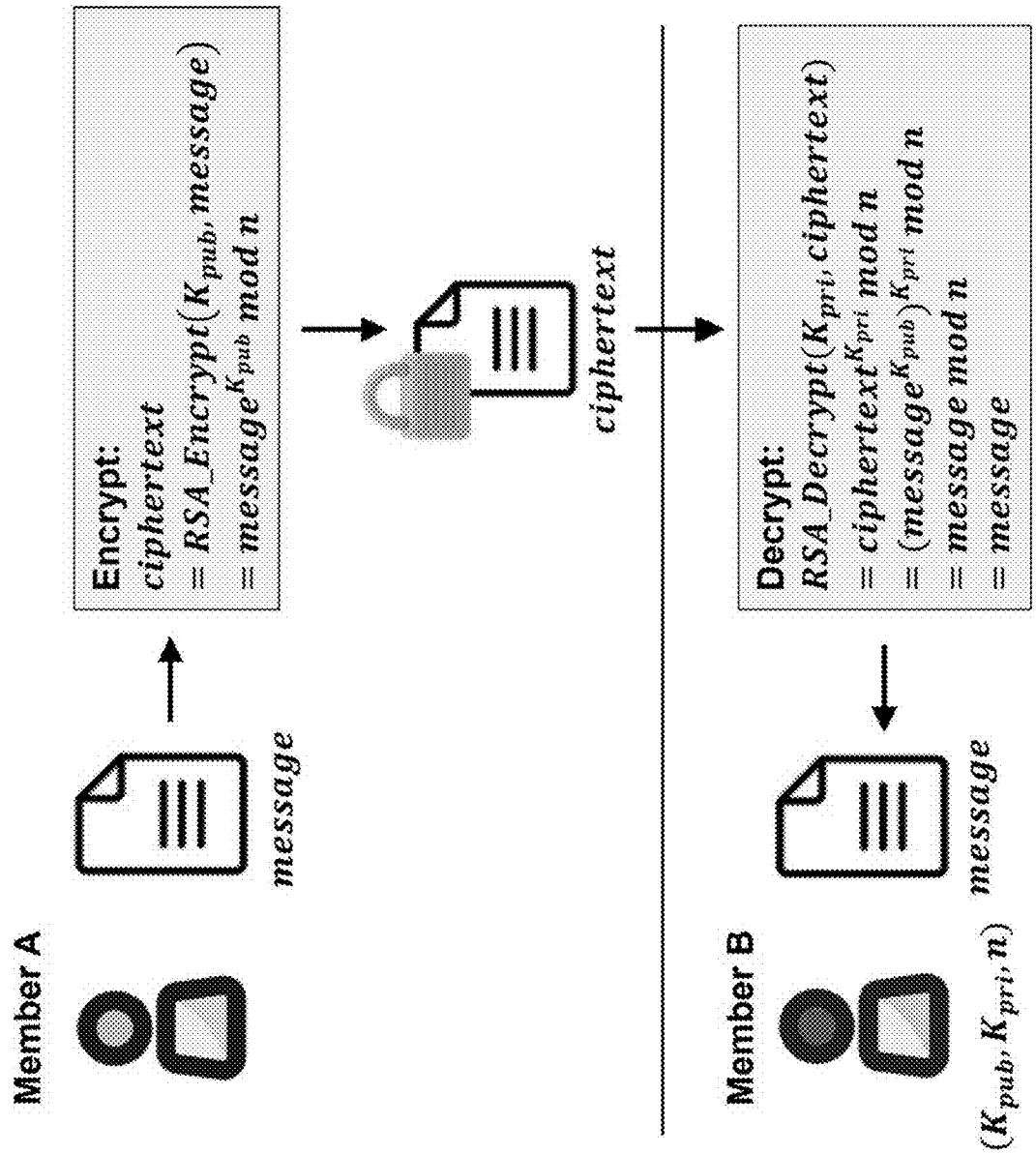
FIG. 11B shows each member randomly picking a large prime number n.

Different proxy re-encryption schemes can be constructed based on different asymmetric encryption algorithms. The Rivest-Shamir-Adleman (RSA) algorithm, which is one of the recommended asymmetric encryption algorithms by The National Institute of Standards and Technology (NIST), is utilized to develop a proxy re-encryption mechanism considering its security, simplicity, and convenience of implementation. As shown in FIG. 11B, each member randomly picks a large prime number n, from which a public key $K_{pub}$ and private key $K_{pri}$ are derived. Based on modular arithmetic of large prime numbers, the RSA algorithm can securely conduct the encryption and decryption.

Figure 11C:
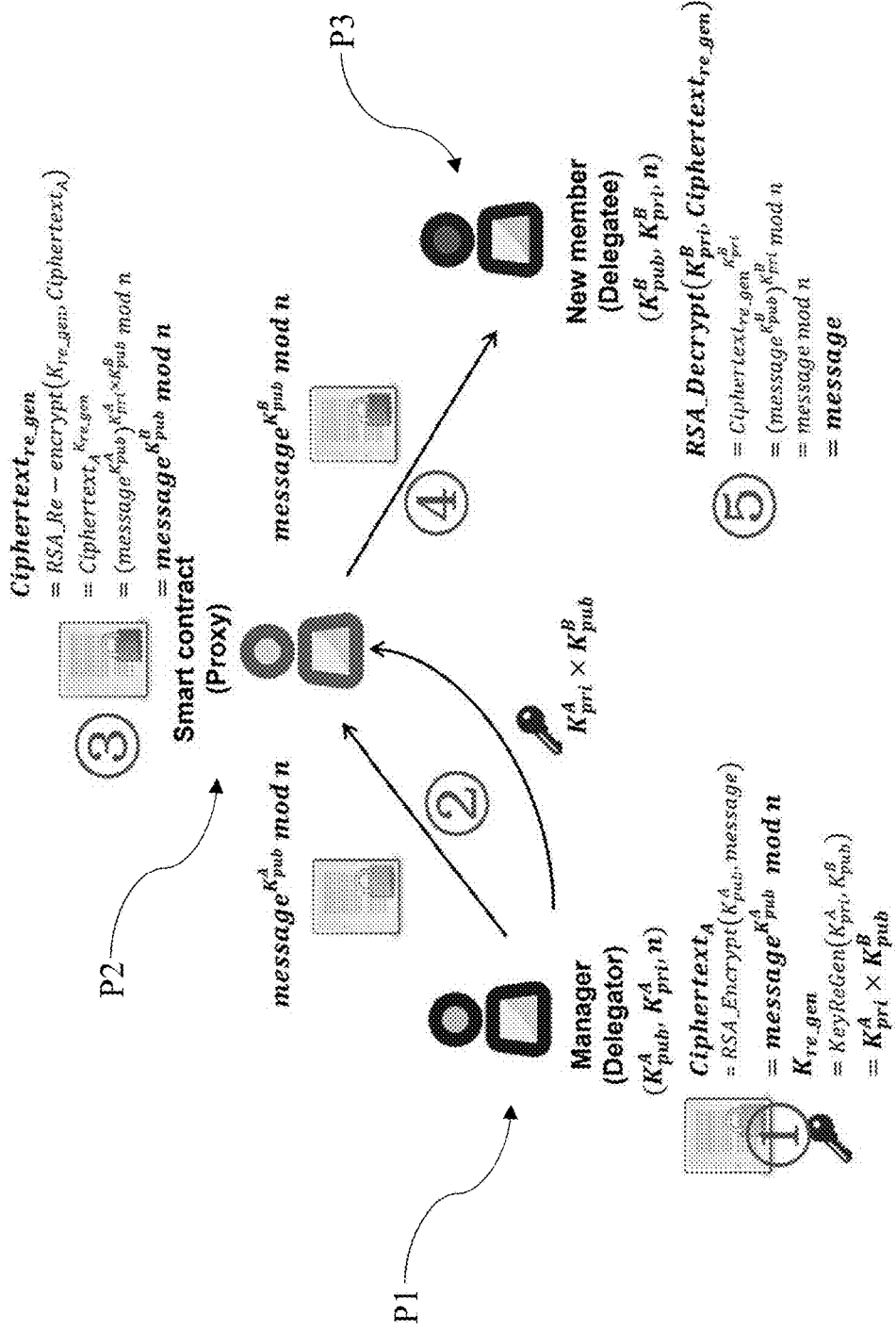
FIG. 11C depicts an RSA-based proxy re-encryption mechanism according one embodiment of the present invention.

In the path III in the part two as depicted in FIG. 8A and FIG. 8B, the designed RSA-based proxy re-encryption mechanism as shown in FIG. 11C is applied, which depicts an RSA-based proxy re-encryption mechanism, with the following strategies in respect of construction project characteristics:

Delegator P1: a current project member who transfers the data access to new members. The delegator P1 creates the re-encryption key, which is sent to the proxy, and specifies which data accesses need to be transferred. Considering the hierarchical structure in construction projects, the delegator P1 in this mechanism is the manager of the discipline to which the new member belongs, according to the project hierarchy, to avoid extra communication and approval workflows.

Proxy P2: an entity to conduct the re-encryption process where the ciphertexts that are encrypted for the delegator P1 are transformed into new ciphertexts that the delegatee P3 can decrypt. The smart contract, a self-executed and trustable computer program, is utilized as a novel proxy to automate the repetitive re-encryption task and hence eliminate human efforts in this process.

Delegatee P3: a new member involved in the middle of the project who needs access to the data encrypted without his/her public key at earlier stages.

When there is a new member (e.g., Delegatee P3) in the project, the new member first obtains a key pair based on the same n as the manager (e.g., the Delegator P1). The manager (e.g., the Delegator P1) generates a re-encryption key by multiplying the own private key with the new member's public key (e.g., the public key of Delegatee P3). Next, the re-encryption key and the RSA-encrypted ciphertext whose access needs to be transferred are sent to the smart contract at Proxy P2. The smart contract then uses the RSA algorithm to encrypt the ciphertext with the re-encryption key to produce a re-encrypted ciphertext for the new member (e.g., Delegatee P3).

Based on the RSA properties shown in FIG. 11A and FIG. 11B, the re-encrypted ciphertext looks like the original data was encrypted using RSA with the new member's public key (e.g., public key of Delegatee P3). Thus, the new member (e.g., Delegatee P3) can decrypt the re-encrypted ciphertext with his/her private key to get access to the original data if needed.

Through this RSA-based proxy re-encryption mechanism that leverages smart contracts to perform the re-encryption, dynamic new members in a construction project can be granted data access without the need for decrypt-and-encrypt, which greatly reduces human workloads and computer's power consuming while keeping the data securely in the access transfer process. It is noted that the RSA-based design is for illustration purposes in the present disclosure and thus embodiments of the present invention are not limited by RSA-based design only. In various embodiments, different asymmetric encryption algorithms can be used to construct the mechanism to comply with different scenarios or requirements.

As such, as applied these strategies to illustrations of FIG. 8A and FIG. 8B, when a new member (e.g., new member N1) operates the access interface 201 and wants to access this sensitive cost information, the new member first obtains a key pair based on the same n as the manager (i.e., another member) at the re-encryptor 500. The re-encryptor 500 generate re-encryption key, e.g., $K_{D1 \to N1}$, using the manager's private key $K_{pri}^{D1}$, and new member's public key $K_{pub}^{N1}$. The re-encryptor 500 encrypt encrypted K, $E_{K_{pub}^{D1}}(K)$, using $K_{D1 \to N1}$ to obtain re-encrypted key K, $E_{K_{D1 \to N1}}(E_{K_{pub}^{D1}}(K))$. The new member N1 can use the re-encryptor 500 to decrypt the re-encrypted K, $E_{K_{D1 \to N1}}(E_{K_{pub}^{D1}}(K))$ with using $K_{pri}^{N1}$, so as to obtain key K for decrypting the encrypted cost information with ushing the key K. Thereafter, the re-encryptor 500 has the process go to the recorder 202 and then the determinator 204 for information accessing. In one embodiment, the re-encrypting K is performed by using smart contracts of the smart contractor module 300.

Automatic and Encryption-integrated Smart Contracts are described below.

Identification of Smart Contract Functions:

Referring to FIG. 8A and FIG. 8B, the smart contract in a blockchain network enables project members to interact automatically with the blockchain ledger's data. In the present invention, it develops encryption-integrated smart contracts to manage both transparent and confidential data on the blockchain. The developed smart contracts are an integral part of the proposed framework to connect project members, the blockchain ledger, and the access control mechanisms for automatic and secure cost management activities on the blockchain.

Firstly, four smart contract functions are identified based on the major cost management activities in the proposed framework, as shown in Table 1. These smart contract functions can be triggered by the determinator 204 so the determinator 204 can activate and sign up them.

TABLE 1

Identification of smart contract functions based on cost management activities in the proposed framework

| Cost management activities in the proposed framework | Explanation | Smart contract function |
|---|---|---|
| Encryption key distribution | Public keys of all the members should be generated and shared in the blockchain network so that others can use them for access control if necessary. | DIST_KEY |
| Cost data recording | Transactions containing the identified planned and actual cost-related information should be recorded in the blockchain network while preserving the confidentiality of cost-sensitive data | RECORD |
| Cost data retrieval | The recorded transactions on the blockchain should be retrieved as 1) authentic data sources for cost analysis; 2) uncontroversial evidence in case of disputes, etc., while preventing the leakage of cost-sensitive data | RETRIEVE |
| Cost data access transfer | When new members dynamically join the network in the middle of the project, the decryption ability to previous cost-sensitive data should be transferred to them securely and efficiently if they have the right to access the data. | TRANSFER |

4.3.2. Development of Smart Contract Algorithms

The function "DIST_KEY" of the smart contract includes (1) pre-validating the input transaction; (2) generating a block containing the transaction; and (3) broadcasting the block for being added in blockchain. The DIST_KEY allows project members to distribute their public keys in the blockchain network so that others can use them to encrypt data if access control is needed. The input is a transaction including a member ID and his/her public key. The output is a new block containing the distributed key information. The input transaction is validated first. Then, the ordering service chronologically packages transactions to generate a new block containing the transaction data and other block metadata. Afterward, the transactions are broadcasted in the blockchain network, and the project members verify and add them to their ledgers. Finally, the initiator is notified that the key information has been distributed in the network successfully.

The function "RECORD" of the smart contract includes (1) encryption based on proposed access control model including that encrypting the sensitive data using symmetric key and that encrypting the symmetric key using receivers' public keys; and (2) uploading the transaction data in blockchain including that pre-validating the transaction, generating a block containing the transaction, and broadcasting the block for being added in blockchain. The RECORD is used to upload cost data on the blockchain while encrypting sensitive ones to preserve confidentiality. The input is the cost data to be recorded, and the output is a new block including the recorded cost information. If the input cost data is sensitive, a symmetric key is used to encrypt it. Public keys of the members who can access it are then retrieved from the blockchain to encrypt the symmetric key further and update the transaction with the encrypted data and multiple encrypted versions of the symmetric key for different receivers. Next, the updated transaction with confidentiality or the original non-sensitive transaction is uploaded on the blockchain. This step is similar to the DIST_KEY function except for the transaction data model.

The function "RETRIEVE" of the smart contract includes (1) pre-validating the input transaction; (2) getting corresponding values from blockchain ledger; and (3) decrypting the data to get access if it is encrypted. The RETRIEVE supports the querying of cost data from the blockchain and ensures that only authorized project members can access certain sensitive data. The inputs are the cost data information to be retrieved (i.e., transaction ID and data field) and the private key of the project member who retrieves it. The output is the retrieved value. The smart contract first obtains the cost data transaction according to the input ID from the blockchain. The value of the retrieved cost data field is then obtained from the returned transaction. If the retrieved value is encrypted (i.e., the data is sensitive), the private key is used to decrypt the encrypted version of the symmetric key in the keys for decryption field of the transaction. If the decryption succeeds, the obtained symmetric key will be used to decrypt the retrieved ciphertext to get the original value. Otherwise, the member is prevented from accessing this sensitive cost data.

The function "TRANSFER" of the smart contract includes (1) obtaining new member's public key; (2) generating a re-encryption key and get transactions whose accesses need to be transferred; and (3) re-encrypting corresponding transactions using the re-encryption key and update the transactions in blockchain. The TRANSFER grants new project members access to the data that was not intended for them in the first place through the proxy re-encryption-based mechanism as afore-described, and is invoked by the manager who transfers the data access. The inputs include IDs of transactions whose accesses need to be transferred, IDs of the new member and the manager of the discipline to which the new member belongs, and the manager's private key. The public key of the new member is first obtained from the blockchain. Based on the RSA-based proxy re-encryption mechanism afore-described, a re-encryption key is generated and used to re-encrypt the manager's decryption key (i.e., the symmetric key encrypted with the manager's public key) in the smart contract. The transaction whose access needs to be transferred is then updated by adding the new member ID and the re-encrypted decryption key in the access by and keys for decryption data fields, respectively. Afterward, the updated transaction is uploaded to the blockchain. The new member can decrypt the re-encrypted decryption key using his/her private key and then use the obtained symmetric key to access the original data by invoking the RETRIEVE smart contract.

ILLUSTRATIVE EXAMPLES

A blockchain network consisting of project owner, designer, consultant quantity surveyor, contractor, and contractor quantity surveyor is established herein. The network is then deployed in three typical construction cost management scenarios to verify the proposed framework's functionalities (i.e., the ability to protect cost data accountability and confidentiality). In this regard, a blockchain-based application in construction should be computationally efficient for practical deployment, which is indicated by latency, throughput, and storage cost. They are thus measured in the present disclosure as well to demonstrate that the computational performance of the proposed framework is satisfactory (i.e., the measured values of latency, throughput, and storage cost are within acceptable ranges) when adopting it in construction processes.

In addition, the security vulnerabilities of the developed smart contracts are assessed to illustrate framework security further.

Figure 12:
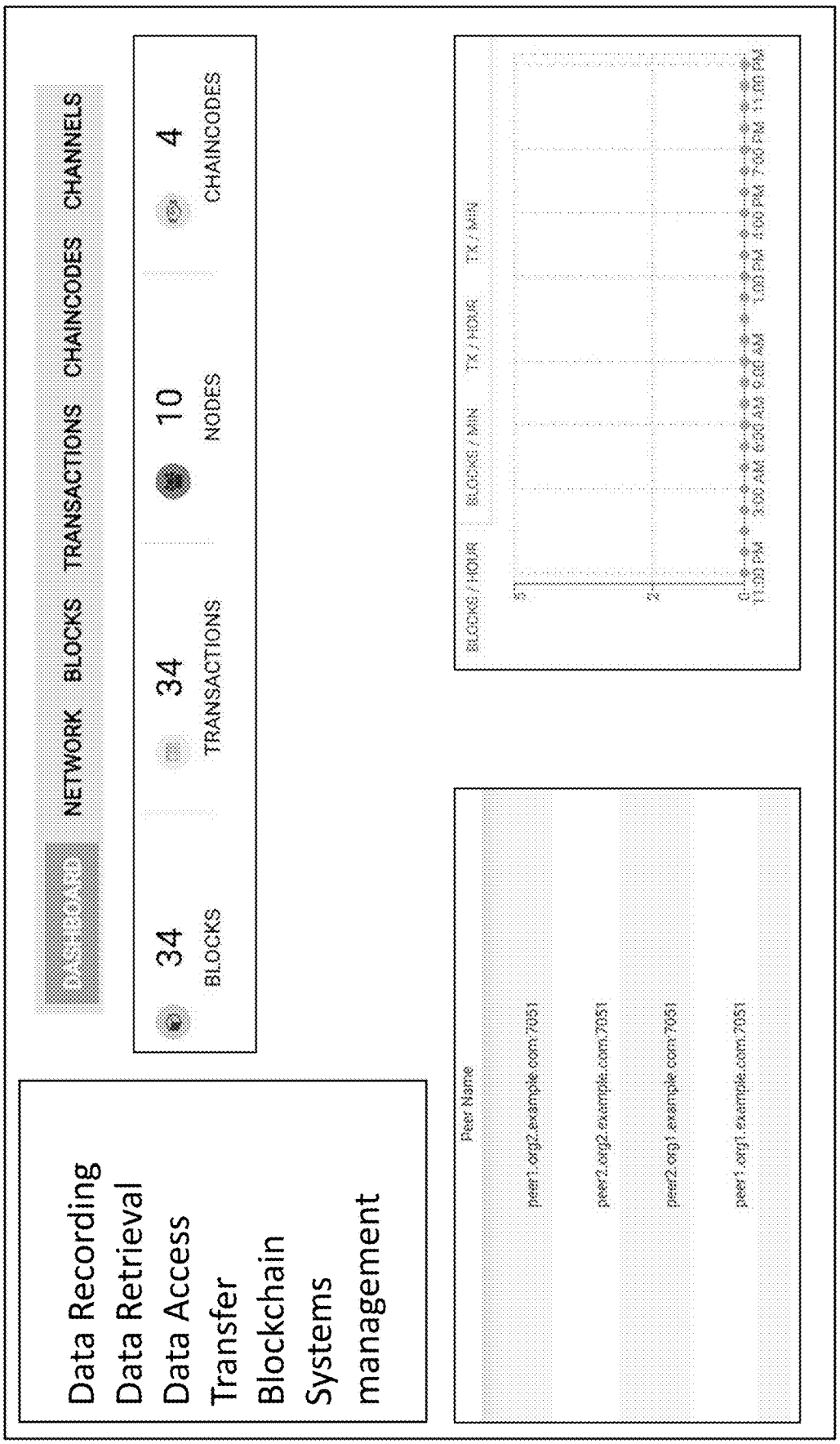
FIG. 12 depicts a user interface, including three main functionality modules: data recording, data retrieval, and data access transfer.

FIG. 12 depicts a User Interface (UI), including three main functionality modules: data recording, data retrieval, and data access transfer according to one embodiment of the present invention. Users can invoke the modules to achieve different functionalities. A blockchain dashboard is integrated with the UI to monitor the blockchain network status.

Five organizations corresponding to the five stakeholders as afore-mentioned (i.e., project owner, designer, consultant quantity surveyor, contractor, and contractor quantity surveyor) are configured in the blockchain network, where each organization has two peers (i.e., project member) for illustration.

Next, there three scenarios for Illustration.

Figure 13:
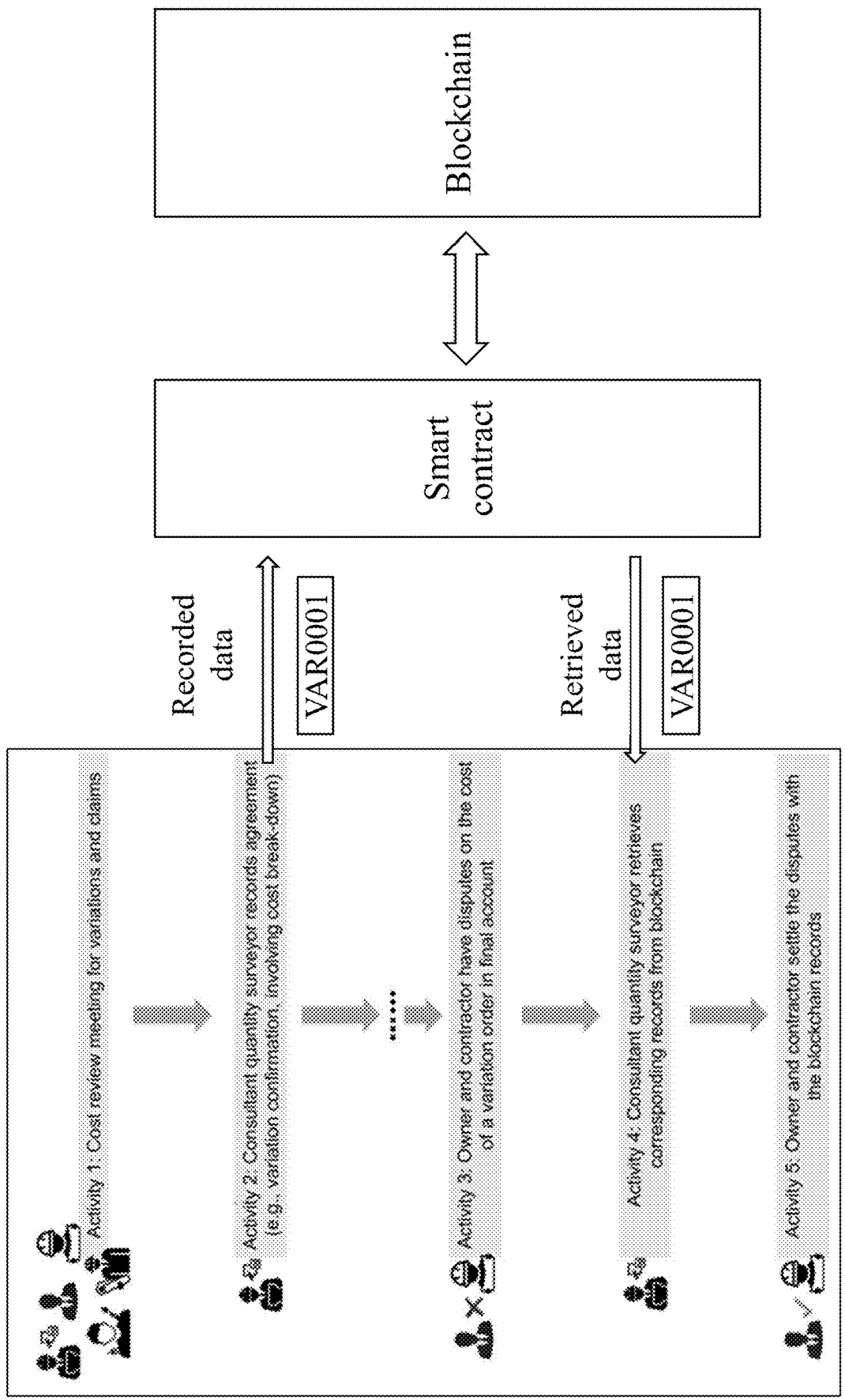
FIG. 13 describes the process where the owner and contractor resolve disputes over variation costs based on retrieved data that is recorded on blockchain at earlier stages.

Scenario 1: Recording and Retrieving Non-Sensitive Variations & Claims Cost Data for Dispute Resolution:

FIG. 13 describes the process where the owner and contractor resolve disputes over variation costs based on retrieved data that is recorded on blockchain at earlier stages, which includes five activities in chronological order in a construction project. In activity 1, stakeholders evaluate the variations and claims and have regular cost review meetings to reach agreements after following the process shown in FIG. 5. The detailed agreement information (e.g., variation confirmation, cost breakdown) is then recorded on the blockchain through the RECORD smart contract in activity 2. The blockchain ledger status shows that a new block containing the transaction VAR001 on the variations and claims cost data has been successfully recorded on the blockchain and is visible to all project members in the network. In the final accounting starting from activity 3, the owner and contractor dispute the total cost of the variation order VAR001. The consultant quantity surveyor helps the owner to retrieve the corresponding data (e.g., total cost, variation description, endorsement of variation instruction) from the blockchain via the RETRIEVE smart contract in activity 4. With the irreversible and authentic blockchain records, the owner and contractor are convinced without further excuses and thus settle the disputes efficiently in activity 5. The implementation of this scenario validates the framework connectivity and shows that project members can keep track of cost records in the project for accountability.

Figure 14:
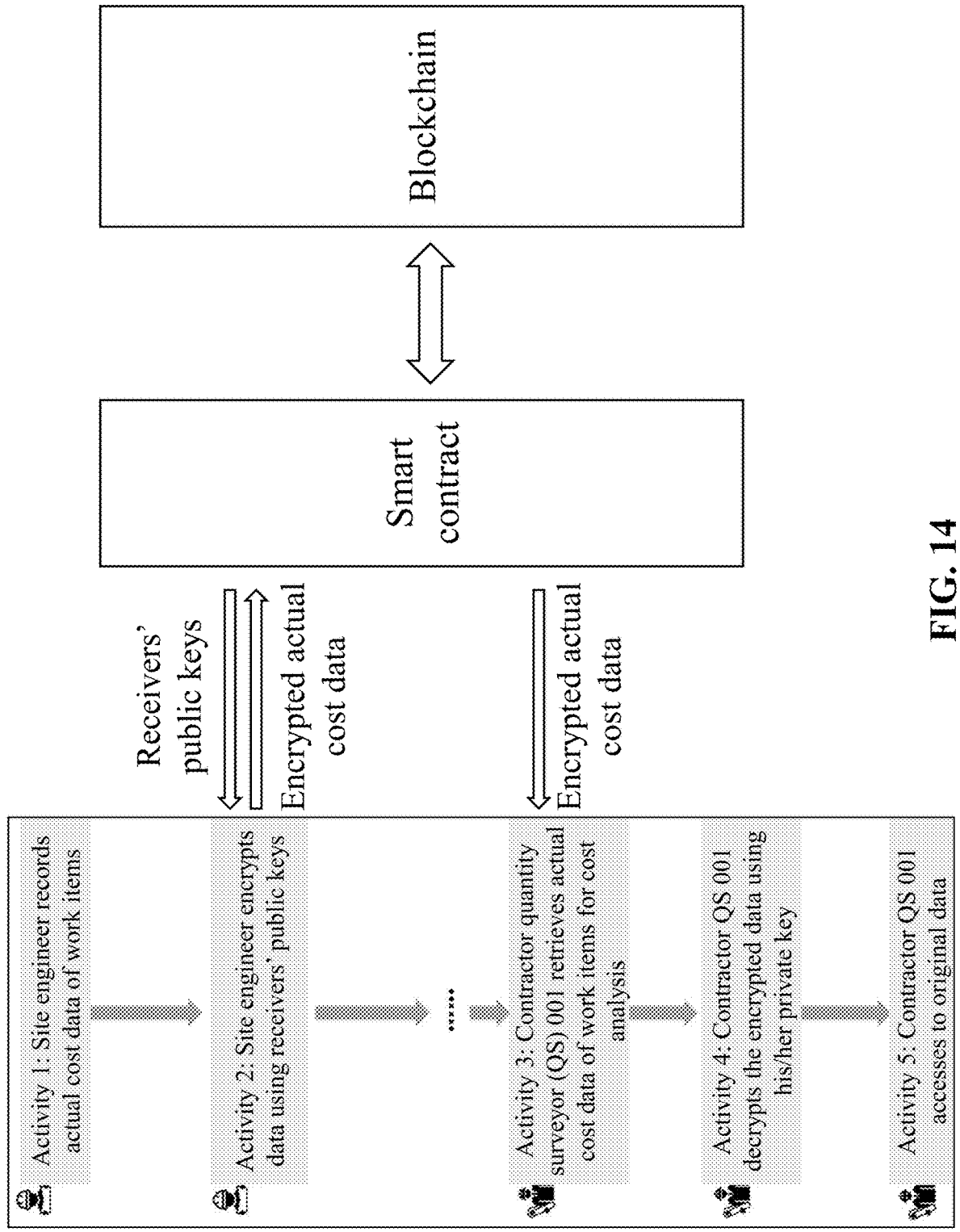
FIG. 14 illustrates how sensitive cost data can be protected to ensure only authorized project members can access it.

Scenario 2: Recording and Retrieving Sensitive Actual Cost Data of Work Items for Cost Analysis:

FIG. 14 illustrates how sensitive cost data can be protected to ensure only authorized project members can access it. In activity 1, the site engineer records the actual cost of a work item. The encryption process based on the proposed access control method in the part one in FIG. 8B is conducted to protect the sensitive actual cost data in activity 2 through the RECORD smart contract. An AES (Advanced Encryption Standard, a NIST-recommended symmetric encryption algorithm) key is first generated randomly to encrypt the quantity, unit cost, and description. The public RSA keys of Contractor 001 and Contractor Quantity Surveyor (QS) 001 (i.e., authorized project members specified in the access by field) are retrieved from the blockchain to encrypt the AES key using the RSA algorithm. The encrypted versions of the AES key for these two members are then added to the keys for decryption field of the transaction. The updated actual cost data transaction containing the encrypted quantity, unit cost and description as well as the encrypted versions of the AES key is then uploaded on the blockchain. In activity 3, if Contractor QS 001 needs to use the actual cost of this recorded work item for regular cost analysis, he/she will invoke the RETRIEVE smart contract to obtain the corresponding transaction and then use his/her private RSA key to decrypt the encrypted AES key in activity 4. The recovered AES key is then used to decrypt the ciphertexts of quantity, unit cost, and description to access the original values. In this process, although all the project members can retrieve the actual cost data transaction, only authorized receivers (e.g., Contractor 001, Contractor QS 001) can decrypt it to access the original values. This indicates that sensitive cost data in construction projects can be protected for confidentiality.

Figure 15:
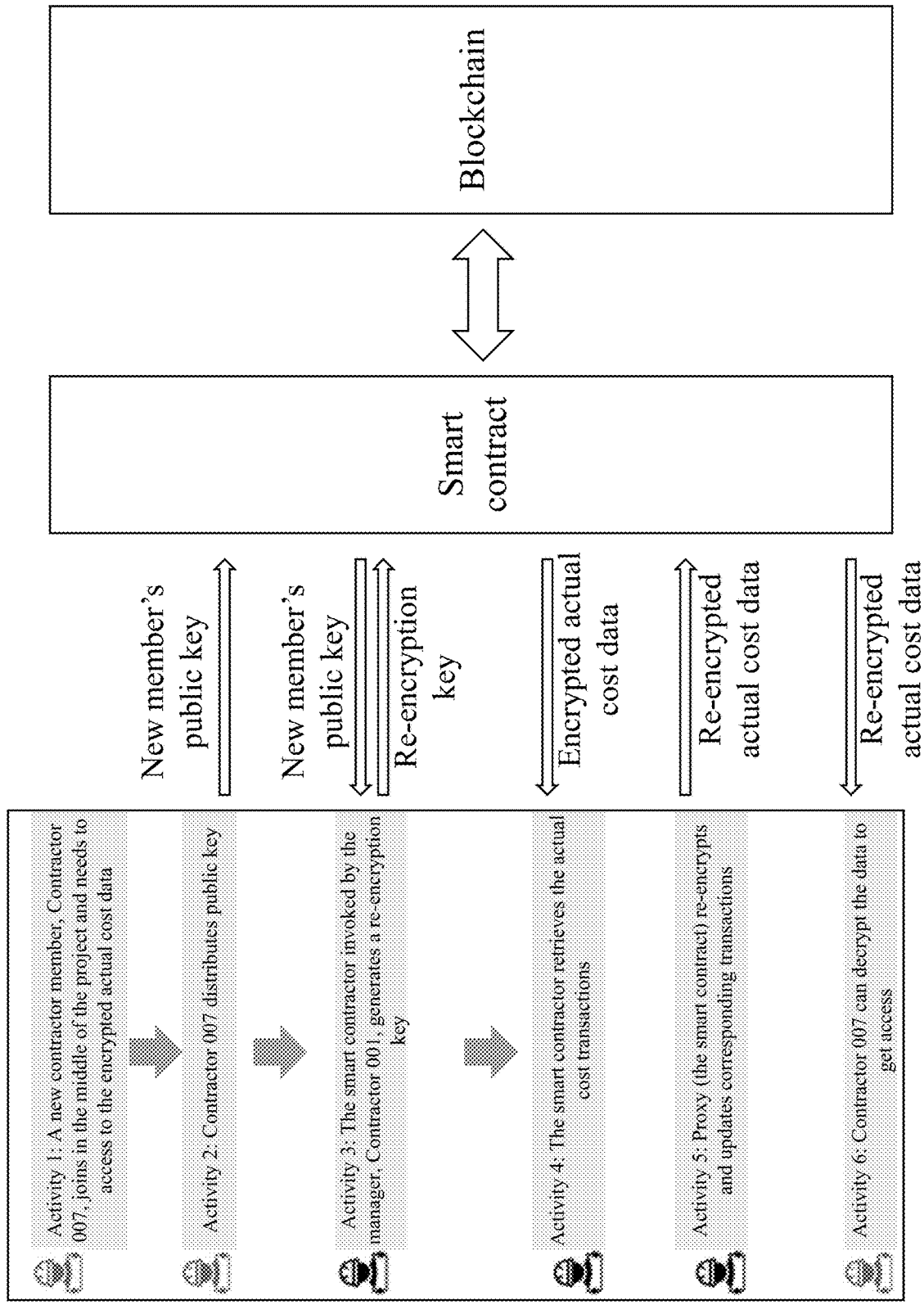
FIG. 15 depicts transferring sensitive cost data access to a newly involved contractor member.

Scenario 3: Transferring Sensitive Cost Data Access to a Newly Involved Contractor Member:

FIG. 15 depicts transferring sensitive cost data access to a newly involved contractor member. This scenario aims to show the dynamic and efficient data access transfer between project members in a construction project. In activity 1, a new contractor member, Contractor 007, becomes involved in the middle of the project and needs to be able to access the actual cost of a work item. The new member distributes his/her public key in the blockchain network with the DIST_KEY smart contract in activity 2. Starting from activity 3, the manager, Contractor 001, invokes the TRANSFER smart contract to transfer the data access based on the proxy re-encryption mechanism as afore-mentioned. The smart contract retrieves the Contractor 001's public key for generating a re-encryption key and the actual cost transaction with encrypted data for re-encryption in activities 3 and 4, respectively. In activity 5, the smart contract acts as a proxy to re-encrypt and update the actual cost transaction. The re-encryption key is used to re-encrypt Contractor 001's decryption key. The generated ciphertext is regarded as Contractor 007's decryption key. The re-encrypted ciphertext and the new member ID, Contactor 007, are then added to the keys for decryption and accessed by fields of the transaction, respectively. Next, the updated transaction is uploaded to the blockchain. In activity 6, Contractor 007 retrieves the corresponding transaction and uses his/her private RSA key to successfully decipher the re-encrypted ciphertext to recover the AES key. The AES key is then used to decrypt the quantity, unit cost, and description ciphertexts to obtain their original values. Such a proxy re-encryption-based process demonstrates that new members in an evolving construction project can be granted access to sensitive data that was not intended for them in the first place securely and efficiently without the need for decrypt-and-encrypt.

Computational efficiency evaluation is provided as follows.

Latency

A lightweight benchmarking tool for Hyperledger Fabric is used to test the blockchain latency and throughput. In the present invention, the latency includes blockchain network latency and encryption mechanism latency. Blockchain network latency is the time cost from sending a transaction to the blockchain to receiving the confirmation from it, which is a measure of the efficiency of the network. According to recommendations and practices in existing studies that investigated blockchain in construction scenarios, the latency should be within 200 milliseconds to be acceptable. For different smart contracts provided by the present disclosure, measurement is taken, such as the latencies of encryption key distribution, cost information recording and retrieval, and data access transfer in the blockchain network. Each task is measured ten times and an average value is calculated. As shown in Table 2, the average latencies of DIST_KEY, RECORD, RETRIEVE, and TRANSFER are 43 ms, 59 ms, 77 ms, and 94 ms, respectively, which indicates that the blockchain transactions in the proposed framework can be submitted and confirmed in the network efficiently, thereby reducing computer processing time.

The encryption mechanism latency refers to the time of encryption, decryption, and re-encryption for access transfer using the proposed access control mechanisms as afore-described (i.e., path I, II, and III in FIG. 8B). Time logs are recorded to calculate the duration. Each mechanism is measured ten times to compute the average value. The results shown in Table 3 are all within 10 ms, meaning that the latencies of the developed access control mechanisms are negligible in the cost management process.

TABLE 2

Blockchain network latency and throughput

| | DIST_KEY | RECORD | RETRIEVE | TRANSFER |
|---|---|---|---|---|
| Latency (millisecond) | 43 | 59 | 77 | 95 |
| Throughput (transaction per second) | 231 | 170 | 129 | 106 |

TABLE 3

Encryption mechanism latency

| | Encryption | Decryption | Proxy re-encryption |
|---|---|---|---|
| Latency (millisecond) | 1.4 | 4.5 | 7.4 |

Throughput

Throughput measures how many transactions the blockchain network can process per second. In this regard, throughput should be larger than 50, which means the network should allow at least 50 blockchain-related actions (e.g., upload cost data, transfer cost data access) to happen simultaneously in a construction project. Similarly, each smart contract as afore-mentioned is invoked and measured ten times to calculate the average throughput. Table 2 shows that the network can handle 231, 170, 129, and 106 transactions for distributing encryption keys, recording and retrieving cost information, and transferring cost data access in one second, respectively, indicating that the proposed framework can afford the transaction loads in most cost activities.

Storage Cost

Storage cost refers to the size of the data generated and stored on blockchain per day in the proposed framework. It is suggested that a storage cost within 10 MB is acceptable in construction projects. Table 4 shows the sizes of the three types of transactions in FIG. 7. The largest variations and claims transaction with a size of 8286 B is considered for calculating the maximal storage cost of a block. Assuming each block contains 10 transactions, and 50 blocks (i.e., 500 transactions) are generated per day, the block size (including block head, block Merkle tree, and transaction data) is 83.581 KB and the blockchain storage cost is 83.581 KB*50=4.179 MB per day, which is acceptable.

TABLE 4

Transaction size in the proposed framework

| Transaction type | Estimated size |
|---|---|
| Planned cost-related records transaction | 108B |
| Actual construction cost transaction | 7965B |
| Variations & claims transaction | 8286B |

Security Evaluation

Since the smart contracts in the proposed framework execute the cost information management activities (e.g., recording, retrieval, access transfer) on the blockchain, it is important to evaluate their security vulnerabilities. In this section, a smart contract security assessment tool is used to assess common security vulnerabilities of the developed smart contracts in the proposed framework. The security vulnerability metrics include blacklisted chaincode imports, global state variables, goroutines, phantom read of ledger, and range over map. With respect to this issue, no security vulnerability problem was detected in the developed smart contracts, which ensures the successful execution of the cost information management activities.

As compared with existing studies that implemented blockchain and smart contract for construction cost management-related purposes (e.g., payment), this invention has the following novelties and contributions:

(I) Firstly, a confidentiality-aware cost data model is identified for holistic construction cost management. Some studies have investigated the benefits of blockchain and smart contracts in construction cost management by keeping traceable financial records and automating payment processes. However, the natural confidentiality requirements of cost information in a transparent blockchain network have not been discussed in depth. Covering different stakeholders and stages comprehensively, the identified data model distinguishes the transparency and confidentiality of the required cost information that should be made public to all project members and private to authorized members only, respectively. This facilitates the partially transparent cost recording on blockchain to preserve both accountability and confidentiality of cost information in a blockchain-based construction cost management process.

(II) Secondly, this invention develops a symmetric-asymmetric encryption integrated and proxy re-encryption-based access control model to protect sensitive cost data on the blockchain. Some studies have emphasized the necessity of access control in the blockchain network to prevent sensitive data leakage. However, the characteristics of construction projects (e.g., dynamic access control for continuous new members in a project) have not been considered appropriately. In this invention, the symmetric-asymmetric encryption integrated way efficiently deals with the one-to-many information exchange in construction projects as aforementioned. The proxy re-encryption-based mechanism eliminates the need for decrypt-and-encrypt to transfer sensitive data access securely and efficiently to new members in a dynamic construction project. The practical access control mechanisms catering for such construction project characteristics protect data confidentiality while taking advantage of the transparent blockchain in construction.

(III) Thirdly, encryption (in particular, proxy re-encryption)-integrated smart contracts are developed for automatic and secure cost activities on the blockchain. Some studies on integrating encryption with blockchain did not incorporate encryption workflows in the self-executing smart contract logic, which requires additional workloads for project members to conduct encryption and decryption operations outside the blockchain. In addition, continuous decrypt-and-encrypt efforts by existing members are needed for sensitive data access transfer on blockchain for new members along the project delivery, which is inefficient and impractical. In this invention, the first is that proxy re-encryption workflows are directly incorporated into smart contract logic to conduct the re-encryption inside the blockchain, which streamlines encrypted data management on the blockchain. Secondly, the smart contract is utilized as a novel proxy for automatic and secure re-encryption. Compared with centralized proxy in existing re-encryption methods, the smart contract proxy, a self-executing trustable computer program, enhances both automation and security of the re-encryption process. After this, the re-encrypted message on the blockchain is accessible to new eligible members who were not granted data access earlier without the need for manual decrypt-and-encrypt.

There are three practical implications and prospects that could be expected as follows:

This invention can maximize trust and minimize disputes in construction cost activities. Too often, stakeholders in construction projects quarrel over cost records (e.g., actual cost, cost variation) to maximize profits for themselves. The proposed blockchain-based framework provides immutable cost data storage to build a trust-worthy and indisputable cost information management environment. Project stakeholders will be convinced with the related records on the blockchain if any disputes arise, thereby enhancing project efficiency.

The second prospect is increasing the confidence in adopting blockchain in construction cost management. Although the benefits of blockchain have been recognized in construction cost management (e.g., payment processes), the inherent confidentiality characteristic of cost data concerns project stakeholders in the transparent blockchain network. Considering construction project-specific access control requirements (e.g., dynamic access control for continuous new members in a project), this invention provides a practical encryption-based solution to protect sensitive cost data, thus increasing partitioners' willingness and confidence in adopting blockchain to improve project efficiency.

Last but not least, this invention provides an adaptive blockchain-based and encryption-aided solution. The proposed novel framework for construction projects is not limited to cost management. It can also be applied to other construction industry scenarios where data accountability and confidentiality need to be preserved while considering practical project characteristics. For example, the proxy re-encryption-based mechanisms for dynamic access control and encryption-integrated smart contracts can also empower blockchain-based design collaboration and facility management.

As discussed above, in the present invention, a cost data model with confidential information is identified, based on which partially transparent cost recording on the blockchain is facilitated. A symmetric-asymmetric integrated encryption mechanism is designed to protect the cost data confidentiality on the blockchain. In addition, a proxy re-encryption-based mechanism is proposed to transfer confidential cost data access securely and efficiently to new members in an evolving construction project. Smart contracts integrating the encryption mechanisms are then developed to automate and secure the identified cost activities on the blockchain. The framework is applied to three typical construction cost management scenarios for illustration. The results validate the feasibility and performance through (1) keeping cost data accountable in dispute resolutions; (2) preserving cost data confidentiality in cost analysis; and (3) transferring confidential cost data access to newly involved project members, with latency at the millisecond level, throughput at the hundred level, and storage cost at the MB level.

The functional units and modules of the apparatuses and methods in accordance with the embodiments disclosed herein may be implemented using computing devices, computer processors, or electronic circuitries including but not limited to application specific integrated circuits (ASIC), field programmable gate arrays (FPGA), microcontrollers, and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the methods in accordance to the embodiments may be executed in one or more computing devices including server computers, personal computers, laptop computers, mobile computing devices such as smartphones and tablet computers.

The embodiments may include computer storage media, transient and non-transient memory devices having computer instructions or software codes stored therein, which can be used to program or configure the computing devices, computer processors, or electronic circuitries to perform any of the processes of the present invention. The storage media, transient and non-transient memory devices can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units and modules in accordance with various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A system for cost management using blockchain and encryption for reducing computer processing time, comprising:
    an access interface configured to provide a platform for users to log in;
    a recorder coupled with the platform for recording cost information;
    a determinator coupled with the recorder and configured to determine whether the cost information recorded in the recorder is non-sensitive, wherein, when the cost information is determined as being non-sensitive by the determinator, the determinator is further configured to trigger a smart contractor module which is able to interact with the determinator to generate and complete a transaction containing the cost information, and the cost information is directly uploaded to and recorded on a blockchain network via the smart contractor module;
    a key generator coupled with the determinator, wherein, when the cost information is determined as being sensitive by the determinator, the key generator is configured to generate a symmetric key randomly;
    an encryptor coupled with the key generator and configure to encrypt the cost information using the symmetric key to obtain ciphertext information and encrypt the symmetric key using public keys to obtain encrypted keys, wherein the encryptor sends the ciphertext information to the blockchain network via the smart contractor module for recording; and
    a decryptor coupled with the platform for decrypting the encrypted keys using private keys corresponding to the public keys, wherein, when the decrypting fails, an access request is denied by the decryptor, and wherein, when the decrypting successes, the decryptor is permitted to use the symmetric key K to decrypt the ciphertext information.

2. The system of claim 1, wherein the encryptor is further configured to send the encrypted keys to the smart contractor module, and the system further comprises:
    a key destroyer coupled with the encryptor configured to destroy the symmetric key in a memory after the smart contractor module receives the encrypted keys.

3. The system of claim 2, wherein the key destroyer destroys the symmetric key to erase it by overwriting the memory multiple times with other unrelated information, comprising random bits or all zero or one bits.

4. The system of claim 1, further comprising:
    a re-encryptor coupled with the plat form for generating a re-encryption key using a sender private key and a receiver public key and for encrypting at least one of the encrypted keys using the re-encryption key to obtain a re-encrypted key, which is to be decrypted by using a receiver private key.

5. The system of claim 4, wherein the re-encryptor is permitted to decrypt the re-encrypted key using the receiver private key so as to obtain a key for decrypting the encrypted ciphertext information.

6. The system of claim 1, wherein the platform allows different stakeholders to log in via the access interface, enabling multiple simultaneous accesses.

7. The system of claim 1, wherein the platform is made for a construction project such that the access interface is further configure to assign construction-related characteristics for the users.

8. The system of claim 7, wherein the construction-related characteristics include roles in owners, designers, consultants for quantity surveyors (QS), contractors, contractors QS, or combinations thereof.

9. The system of claim 1, wherein the determinator triggers the smart contractor module to activate smart contract functions and sign smart contracts provided by the smart contractor module, comprising encryption key distribution, cost data recording, cost data retrieval, and cost data access transfer.

10. The system of claim 9, wherein the encryption key distribution is activated, generating and sharing public keys for all members in the blockchain network, enabling users to utilize them for access control.

11. The system of claim 9, wherein the cost data recording is activated for transactions containing identified planned and actual cost-related information, which is recorded in the blockchain network while preserving confidentiality of cost-sensitive data.

12. The system of claim 9, wherein the cost data retrieval is activated for the recorded transactions on the blockchain network, enabling retrieval as authentic data sources for cost analysis and providing uncontroversial evidence in case of disputes, all while preventing leakage of cost-sensitive data.

13. The system of claim 9, wherein the cost data access transfer is activated to enable secure and efficient transfer of decryption abilities for previous cost-sensitive data to a new member joining the blockchain network, provided the new member has the right to access the cost-sensitive data.

* * * * *